(12) United States Patent
Taura

(10) Patent No.: US 10,576,377 B2
(45) Date of Patent: Mar. 3, 2020

(54) PROGRAM AND SYSTEM

(71) Applicant: KABUSHIKI KAISHA SQUARE ENIX, Tokyo (JP)

(72) Inventor: Takahisa Taura, Osaka (JP)

(73) Assignee: KABUSHIKI KAISHA SQUARE ENIX, Tokyo (JP)

( * ) Notice: Subject to any disclaimer, the term of this patent is extended or adjusted under 35 U.S.C. 154(b) by 53 days.

(21) Appl. No.: 15/900,997

(22) Filed: Feb. 21, 2018

(65) Prior Publication Data

US 2018/0236357 A1    Aug. 23, 2018

(30) Foreign Application Priority Data

Feb. 22, 2017   (JP) .................................. 2017-030776

(51) Int. Cl.
*A63F 13/55* (2014.01)
*A63F 13/40* (2014.01)
(Continued)

(52) U.S. Cl.
CPC .............. *A63F 13/55* (2014.09); *A63F 13/25* (2014.09); *A63F 13/35* (2014.09); *A63F 13/40* (2014.09);
(Continued)

(58) Field of Classification Search
CPC ........... A63F 13/55; A63F 13/40; A63F 13/25
(Continued)

(56) References Cited

U.S. PATENT DOCUMENTS

| RE35,314 E  * | 8/1996 | Logg ....................... A63F 13/10 463/2 |
| 7,789,741 B1* | 9/2010 | Fields ...................... A63F 13/10 463/2 |

(Continued)

FOREIGN PATENT DOCUMENTS

| JP | 09-164272 | 6/1997 |
| JP | 2002-219280 | 8/2002 |

(Continued)

OTHER PUBLICATIONS

Office Action from Japan Patent Office (JPO) in Japanese Patent Appl. No. 2017-030776, dated Jan. 16, 2018, together with an English language translation.

(Continued)

*Primary Examiner* — Michael A Cuff
(74) *Attorney, Agent, or Firm* — Greenblum & Bernstein, P.L.C.

(57) ABSTRACT

A non-transitory computer-readable medium including a program product for causing a server to realize functions to control progress of a video game in a game space is provided. The functions include: a starting function configured to start, in a case where a player character becomes a game continuation disabled state in the game space, progress of the video game by using, as the player character, a character the same as or different from the player character that became the game continuation disabled state; and an arranging function configured to arrange, as an object corresponding to the player character that became the game continuation disabled state, a corresponding object at a spot of the game space where the player character became the game continuation disabled state or in the vicinity of the spot, predetermined information regarding the player character being associated with the corresponding character.

11 Claims, 14 Drawing Sheets

(51) Int. Cl.
*A63F 13/25* (2014.01)
*A63F 13/5375* (2014.01)
*A63F 13/5372* (2014.01)
*A63F 13/69* (2014.01)
*A63F 13/35* (2014.01)

(52) U.S. Cl.
CPC ...... *A63F 13/5372* (2014.09); *A63F 13/5375* (2014.09); *A63F 13/69* (2014.09)

(58) Field of Classification Search
USPC .......................................................... 463/31
See application file for complete search history.

(56) References Cited

U.S. PATENT DOCUMENTS

| | | | |
|---|---|---|---|
| 8,430,751 B2* | 4/2013 | Yamada | A63F 13/10 |
| | | | 463/31 |
| 9,519,987 B1* | 12/2016 | Kharkar | G06T 13/40 |
| 9,656,161 B1* | 5/2017 | Bowman | A63F 13/12 |
| 2003/0017873 A1 | 1/2003 | Ohara et al. | |
| 2005/0054401 A1* | 3/2005 | Utsu | A63F 13/10 |
| | | | 463/1 |
| 2007/0054719 A1 | 3/2007 | Ohara et al. | |
| 2017/0151502 A1 | 6/2017 | Yasuda | |
| 2017/0266557 A1* | 9/2017 | Fujiwara | A63F 13/537 |

FOREIGN PATENT DOCUMENTS

| | | |
|---|---|---|
| JP | 2002-325965 | 11/2002 |
| JP | 2010-088695 | 4/2010 |
| JP | 2012-125286 | 7/2012 |
| JP | 2017-093978 | 6/2017 |

OTHER PUBLICATIONS

Office Action from Japan Patent Office (JPO) in Japanese Patent Appl. No. 2018-189486, dated Oct. 8, 2019, together with an English language translation.

[Nioh] "About the specifications of sword-mound and bloody sword-mound," [online], Publication date of Jan. 30, 2017,URL: https://ja.samurai-gamers.com/nioh/katanaduka/, together with a partial English language translation.

* cited by examiner (SEVER)

USER RELATED INFORMATION

| USER INFORMATION | | | PLAYER CHARACTER INFORMATION | | | | | |
|---|---|---|---|---|---|---|---|---|
| USER ID | POSSESSION INFORMATION | ... | ARTIFICIAL BODY ID | ACTION HISTORY | | ... | SETTING INFORMATION | PARAMETER INFORMATION | ... |
| | | | | TIME | OBLITERATE NUMBER OF ENEMY CHARACTERS | | | | |
| P128 | ITEM A, SKILL B ... | ... | PC0067 | 29:36.00 | 358 | ... | CHIP B, EQUIPMENT G ... | LP:100 AP:56 DP:40 ... | ... |
| ⋮ | ⋮ | ⋮ | ⋮ | ⋮ | ⋮ | ⋮ | ⋮ | ⋮ | ⋮ |

Fig. 16

| FORMER ARTIFICIAL BODY INFORMATION | | | | | | | | | |
|---|---|---|---|---|---|---|---|---|---|
| FORMER ARTIFICIAL BODY ID | STATE INFORMATION | | | USER ID | PREDETERMINED INFORMATION | | | | |
| | UPDATE TIME | POSITIONAL INFORMATION | STAGE | | ACTION HISTORY INFORMATION | | ... | SETTING INFORMATION | PARAMETER INFORMATION |
| | | | | | TIME UNTIL GAME CONTINUATION DISABLE | OBLITERATE NUMBER OF ENEMY CHARACTERS UNTIL GAME CONTINUATION DISABLE | | | |
| PCC067.011 | 2017.1.31 | (X1,Y1,Z1.) | S1 | P128 | 30:01:05 | 468 | ... | CHIP A, EQUIPMENT D, ... | LP:120 AP:75 DP:55 ... |
| ... | ... | ... | ... | ... | ... | ... | ... | ... | ... |

Fig. 17

EVENT INFORMATION

| GENERATION CONDITION | | | | EFFECT |
|---|---|---|---|---|
| ACTION | STATE OF FORMER ARTIFICIAL BODY | USER | ... | |
| COLLECTION | NORMAL | SAME | ... | OBTAIN 100% OF RESPECTIVE PARAMETERS COLLECT CHIP |
| COLLECTION | ROTTEN | SAME | ... | OBTAIN ABOUT 70% OF RESPECTIVE PARAMETERS COLLECT CHIP |
| COLLECTION | POLLUTED | SAME | ... | OBTAIN ABOUT 30% OF RESPECTIVE PARAMETERS COLLECT CHIP |
| COLLECTION | NORMAL | DIFFERENT | ... | OBTAIN 100% OF RESPECTIVE PARAMETERS COLLECT CHIP |
| COLLECTION | ROTTEN | DIFFERENT | ... | OBTAIN ABOUT 70% OF RESPECTIVE PARAMETERS TIME LIMIT (120 SEC.) FOR CHIP COLLECTION |
| COLLECTION | POLLUTED | DIFFERENT | ... | OBTAIN ABOUT 30% OF RESPECTIVE PARAMETERS TIME LIMIT (60 SEC.) FOR CHIP COLLECTION |
| REPAIR | NORMAL | — | ... | BECOME MEMBER |
| REPAIR | ROTTEN | — | ... | BECOME MEMBER |
| REPAIR | POLLUTED | — | ... | BECOME ENEMY |
| ⋮ | ⋮ | ⋮ | ⋮ | ⋮ |

PROGRAM AND SYSTEM

CROSS-REFERENCE TO RELATED APPLICATION

The present application relates to subject matter contained in Japanese Patent Application No. 2017-030776 filed on Feb. 22, 2016, the disclosure of which is expressly incorporated herein by reference in its entirety.

BACKGROUND OF THE INVENTION

1. Field of the Invention

At least one of embodiments according to the present invention relates to a non-transitory computer-readable medium including a program for causing a server to realize functions to control progress of a video game in a game space. Further, at least one of the embodiments according to the present invention relates to a system for controlling progress of a video game in a game space, the system including a communication network, a server, and a user terminal. Moreover, at least one of the embodiments according to the present invention relates to a non-transitory computer-readable medium including a program for causing a user terminal to realize functions to control progress of a video game in a game space.

2. Description of the Related Art

Heretofore, a video game system in which a user operates a predetermined player character that fights against an enemy character, which is an enemy, in a virtual game space has been developed.

In such a video game system, in a case where the player character died as a result of fight against the enemy character, a place where the player character died is used for progress of a video game as a special position in the virtual game space. For example, there is one video game in which information when a first player character died is provided to other user whose second player character arrives at a place where the first player character died (see Japanese Patent Application Publication No. 2002-325965).

However, in such a video game system, the information when the first player character died at the place is merely provided to the other user, and usage of the information for progress of the video game was limited. Namely, there has been a room for improvement with respect to improvement of interest in or the taste of a video game by using a situation that a player character became a game continuation disabled state.

SUMMARY OF THE INVENTION

It is an object of at least one of embodiments according to the present invention to solve the problem described above, to increase the range of progress of a video game by using a situation to become a game continuation disabled state, and to improve interest in or the taste of the video game.

According to one non-limiting aspect of one embodiment of the present invention, there is provided a non-transitory computer-readable medium including a program product for causing a server to realize functions to control progress of a video game.

The functions include a starting function configured to start, in a case where a player character becomes a game continuation disabled state in the game space, progress of the video game by using, as the player character, a character the same as or different from the player character that became the game continuation disabled state.

The functions also include an arranging function configured to arrange, as an object corresponding to the player character that became the game continuation disabled state, a corresponding object at a spot of the game space where the player character became the game continuation disabled state or in the vicinity of the spot, predetermined information regarding the player character that became the game continuation disabled state being associated with the corresponding character.

The functions also include a receiving function configured to receive selection of one action from two or more kinds of predetermined actions corresponding to the corresponding object in a case where the player character moves to an arranged position of the corresponding object or the vicinity thereof.

The functions also include a generating function configured to generate a related event in the video game on the basis of the selected one action and the predetermined information, the related event being related to the corresponding object.

According to another non-limiting aspect of one embodiment of the present invention, there is provided a system for controlling progress of a video game in a game space, the system comprising a communication network, a server, and a user terminal.

The system includes a starting section configured to start, in a case where a player character becomes a game continuation disabled state in the game space, progress of the video game by using, as the player character, a character the same as or different from the player character that became the game continuation disabled state.

The system also includes an arranging section configured to arrange, as an object corresponding to the player character that became the game continuation disabled state, a corresponding object at a spot of the game space where the player character became the game continuation disabled state or in the vicinity of the spot, predetermined information regarding the player character that became the game continuation disabled state being associated with the corresponding character.

The system also includes a receiving section configured to receive selection of one action from two or more kinds of predetermined actions corresponding to the corresponding object in a case where the player character moves to an arranged position of the corresponding object or the vicinity thereof.

The system also includes a generating section configured to generate a related event in the video game on the basis of the selected one action and the predetermined information, the related event being related to the corresponding object.

According to still another non-limiting aspect of one embodiment of the present invention, there is provided a non-transitory computer-readable medium including a program product for causing a user terminal to realize functions to control progress of a video game in a game space.

The functions include a starting function configured to start, in a case where a player character becomes a game continuation disabled state in the game space, progress of the video game by using, as the player character, a character the same as or different from the player character that became the game continuation disabled state.

The functions also include an arranging function configured to arrange, as an object corresponding to the player character that became the game continuation disabled state, a corresponding object at a spot of the game space where the player character became the game continuation disabled state or in the vicinity of the spot, predetermined information regarding the player character that became the game continuation disabled state being associated with the corresponding character.

The functions also include a receiving function configured to receive selection of one action from two or more kinds of predetermined actions corresponding to the corresponding object in a case where the player character moves to an arranged position of the corresponding object or the vicinity thereof.

The functions also include a generating function configured to generate a related event in the video game on the basis of the selected one action and the predetermined information, the related event being related to the corresponding object.

According to each of the embodiments of the present application, one or two or more shortages are solved.

BRIEF DESCRIPTION OF THE DRAWINGS

The foregoing and other objects, features and advantages of the present invention will become more readily apparent from the following detailed description of preferred embodiments of the present invention that proceeds with reference to the appending drawings:

FIG. 16 is an explanatory drawing for explaining an example of a storage state of information corresponding to at least one of the embodiments according to the present invention.

FIG. 17 is an explanatory drawing for explaining an example of a storage state of information corresponding to at least one of the embodiments according to the present invention.

DETAILED DESCRIPTION OF THE INVENTION

Hereinafter, examples of embodiments according to the present invention will be described with reference to the drawings. In this regard, various kinds of elements in an example of each embodiment, which will be described below, can appropriately be combined with each other in a range where contradiction or the like did not occur. Further, explanation of the content that will be described as an example of an embodiment may be omitted in another embodiment. Further, the content of operations and/or processing with no relationship to characteristic portions of each embodiment may be omitted. Moreover, various kinds of processing that constitute various kinds of processing flows (will be described below) may be carried out in random order in a range where contradiction or the like did not occur in the content of the processing.

First Embodiment

Figure 1:
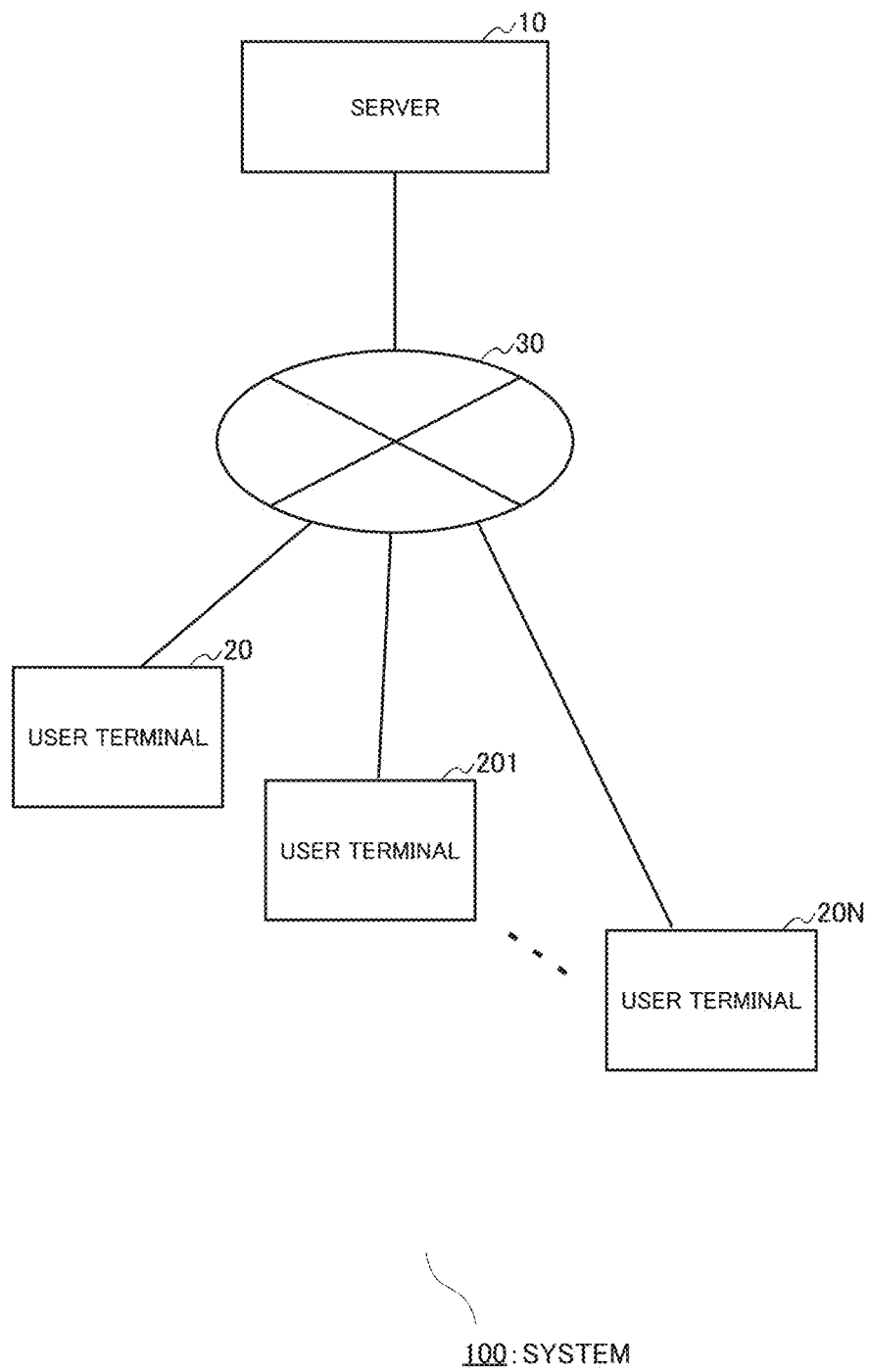
FIG. 1 is a block diagram showing an example of a configuration of a system corresponding to at least one of embodiments according to the present invention.

FIG. 1 is a block diagram showing an example of a configuration of a system 100 according to one embodiment of the present invention. As shown in FIG. 1, the system 100 includes a server 10 and a plurality of user terminals 20 and 201 to 20N ("N" is an arbitrary integer), each of which is used by a user of the system 100. In this regard, a configuration of the system 100 is not limited to this configuration. The system 100 may be configured so that a plurality of users uses a single user terminal, or may be configured so as to include a plurality of servers.

Each of the server 10 and the plurality of user terminals 20 and 201 to 20N is connected to a communication network 30 such as the Internet. In this regard, although it is not shown in the drawings, the plurality of user terminals 20 and 201 to 20N is connected to the communication network 30 by carrying out data communication with base stations managed by a telecommunication carrier by means of a radio communication line.

The system 100 includes the server 10 and the plurality of user terminals 20 and 201 to 20N, thereby carrying out various kinds of processes to control progress of a video game in a game space. Here, the game space means a space in which an object used for progress of the video game exists virtually. The configuration of the game space is not limited particularly so long as the game space is configured to generate a game image therein. For example, the game space may be a two-dimensional space, or a three-dimensional space. Further, the object used for progress of the video game means a virtual object that is used to cause the video game to proceed. As examples of the object used for progress of the video game, there are various kinds of characters, field objects such as virtual buildings in the game space and virtual ground in the game space, and the like. Further, the phrase "progress of the video game" means occurrence of various kinds of progress or changes and the like that can be generated in the video game. As one example of the phrase "occurrence of various kinds of progress or changes and the like that can be generated in the video game", there are progress of time, a change in a parameter of a game element, update of a specific status or a flag, or an operational input by the user, and the like.

The server 10 is managed by an administrator of the system 100, and has various kinds of functions to provide information regarding the various kinds of processes to the plurality of user terminals 20, 201 to 20N. In the present embodiment, the server 10 is constructed by an information processing apparatus, such as a WWW server, and includes a storage medium for storing various kinds of information. In this regard, the server 10 is provided with a general configuration for carrying out the various kinds of processes, such as a control section and a communicating section, as a computer. However, its explanation herein is omitted. Further, in the system 100, it is preferable that the server 10 manages various kinds of information from a point of view to reduce a processing load on each of the plurality of user terminals 20, 201 to 20N. However, a storage region may be provided in a state that the server 10C can access the storage region. For example, the server 10 may be configured so as to be provided with a dedicated storage region outside the server 10.

Further, the server 10 has a function to carry out a process to cause each of the user terminals to display a game image. Here, the phrase "cause each of the user terminals to display an image" means that the user terminal is caused to display the image on a display screen of a display device included in the user terminal. Further, the phrase "cause the display device to display on the display screen" means that the display device included in each of the user terminals 20, 201 to 20N is caused to output an image by means of communication using the communication network 30. As an example of a configuration to cause the display device to display an image, there is a configuration in which information generated at the server 10 side (that is, image information) is transmitted to each of the user terminals 20, 201 to 20N side. In this regard, the configuration of the image information is not limited particularly. For example, the image information may be information in which an image is compressed, or information for causing each of the user terminals 20, 201 to 20N to generate an image. As an example of the information in which an image is compressed, there is one used in a cloud gaming (for example, an MPEG). Further, as an example of the information for causing each of the user terminals 20, 201 to 20N to generate an image, there is one used in an online game (for example, positional information).

Figure 2:
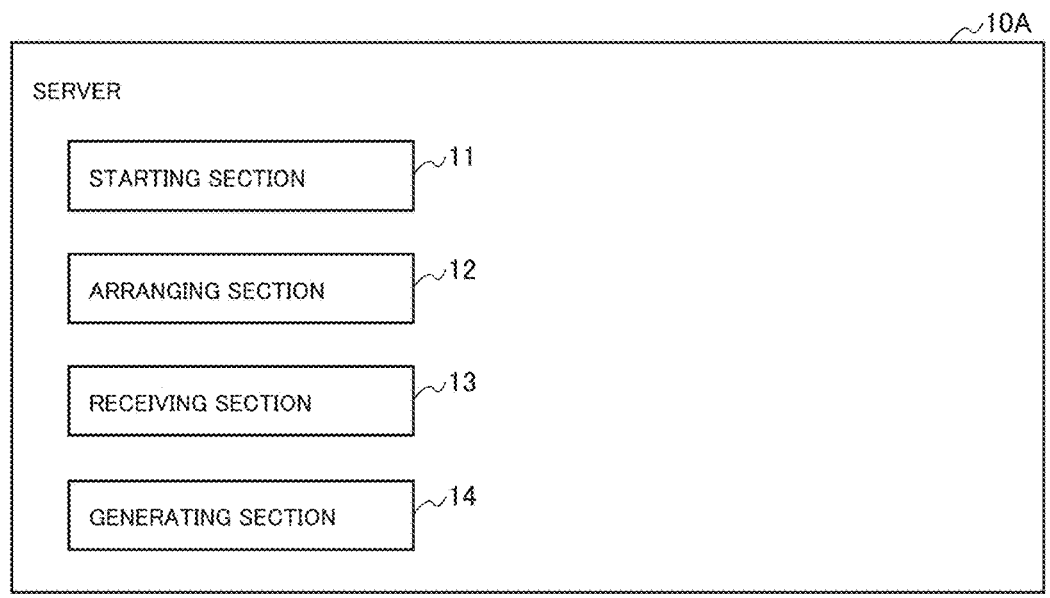
FIG. 2 is a block diagram showing a configuration of a server corresponding to at least one of the embodiments according to the present invention.

FIG. 2 is a block diagram showing a configuration of a server 10A, which is an example of the configuration of the server 10. As shown in FIG. 2, the server 10A at least includes a starting section 11 (which corresponds to one example of a starting function), an arranging section 12 (which corresponds to one example of an arranging function), a receiving section 13 (which corresponds to one example of a receiving function), and a generating section 14 (which corresponds to one example of a generating function).

The starting section 11 has a function to start progress of the video game by using, as a player character, a character the same as or different from a player character that becomes a game continuation disabled state. Here, the player character is not limited to a humanoid object, and may merely be an object. As examples of the player character, there are an object of an automobile, an object of a robot on which a person gets, and the like. In the present embodiment, the same user may operate the player character that became the game continuation disabled state and the player character used for progress of the video game, different users may respectively operate the player characters. Further, the game continuation disabled state means a state where the player character cannot continue progress of the video game in a case where a predetermined parameter set to the player character satisfies a predetermined condition. As one example of the game continuation disabled state, there is a state where a life point (or a life) set to the player character becomes zero.

The arranging section 12 has a function to arrange a corresponding object, which corresponds to the player character that became the game continuation disabled state, at a spot of the game space where the player character became the game continuation disabled state or in the vicinity of the spot. In addition, the arranging section 12 has a function to associate predetermined information regarding the player character that became the game continuation disabled state with the corresponding object. Here, the predetermined information is information that has been associated with the player character that became the game continuation disabled state until the player character became the game continuation disabled state. As one example of the predetermined information, there is action history information regarding an action history of the player character that became the game continuation disabled state. Further, the corresponding object means an object that is arranged in the game space by which the user can recognize that the object is an object corresponding to the player character that became the game continuation disabled state. As one example of the corresponding object, there is a dead body object.

The receiving section 13 has a function to receive selection of one action from two or more kinds of actions corresponding to the corresponding object. Here, it is preferable that the selected one action is one action among two or more kinds of actions that can be selected on the basis of a situation that the player character moves to a position where the corresponding object is arranged (hereinafter, referred to as an "arranged position") or the vicinity thereof in the game space. Further, the action means the content of an action that the player character carries out. As examples of the two or more kinds of actions that can be selected for the corresponding object, there are collection, repair and the like. Further, the phrase "vicinity" means near or neighboring the spot. As one example of the vicinity of the corresponding object, there is a condition or situation that a distance between the player character and the corresponding object in the game space is within a predetermined distance. Further, with respect to the action whose selection is received, selection of one action is received from at least two or more kinds of predetermined actions that become a selectable state.

The generating section 14 has a function to generate an event related to the corresponding object (hereinafter, referred to as a "related event") on the basis of the selected one action and the predetermined information associated with the corresponding object. Here, the event means an incident or occurrence that can be generated in the video game. The related event is one kind of events. As examples of the related event, there are an event in which a predetermined effect related to the corresponding object is generated, an event in which a predetermined privilege related to the corresponding object is given, an event in which a predetermined battle related to the corresponding object is started, and the like. Specifically, when the action called "collection" described above is selected, the event in which the predetermined privilege related to the corresponding object is given may be generated. Further, when the action called "repair" described above is selected, an event in which an object corresponding to the corresponding object becomes an ally character (or a friend character) or an event in which the object corresponding to the corresponding object becomes an enemy character may be generated.

Each of the plurality of user terminals 20, 201 to 20N is managed by a user (or a player) who plays the video game, and is configured by a communication terminal, such as a cellular phone terminal, a PDA (Personal Digital Assistants), a mobile game device, and a so-called wearable divide, by which the user can play a network delivery type game, for example. In this regard, the configuration of the user terminal that the system 100 can include is not limited to the examples described above. It may be a configuration in which the user can recognize the video game. As other examples of the user terminal, there is a combination of a so-called wearable device, such as a smart watch, and a communication terminal or the like configured to communicate with the wearable device.

Further, each of the plurality of user terminals 20, 201 to 20N is connected to the communication network 30, and includes hardware (for example, a display device for displaying a game screen, an audio output device and the like) and software for carrying out the video game by communicating with the server 10. In this regard, each of the plurality of user terminals 20, 201 to 20N may be configured so as to be capable of directly communicating with each other without the server 10. Further, each of the plurality of user terminals 20, 201 to 20N outputs an image of the video game to the display device included therein on the basis of information transmitted from the server 10 (for example, information regarding a game image).

Next, an operation of the system 100 according to the present embodiment will be described.

Figure 3:
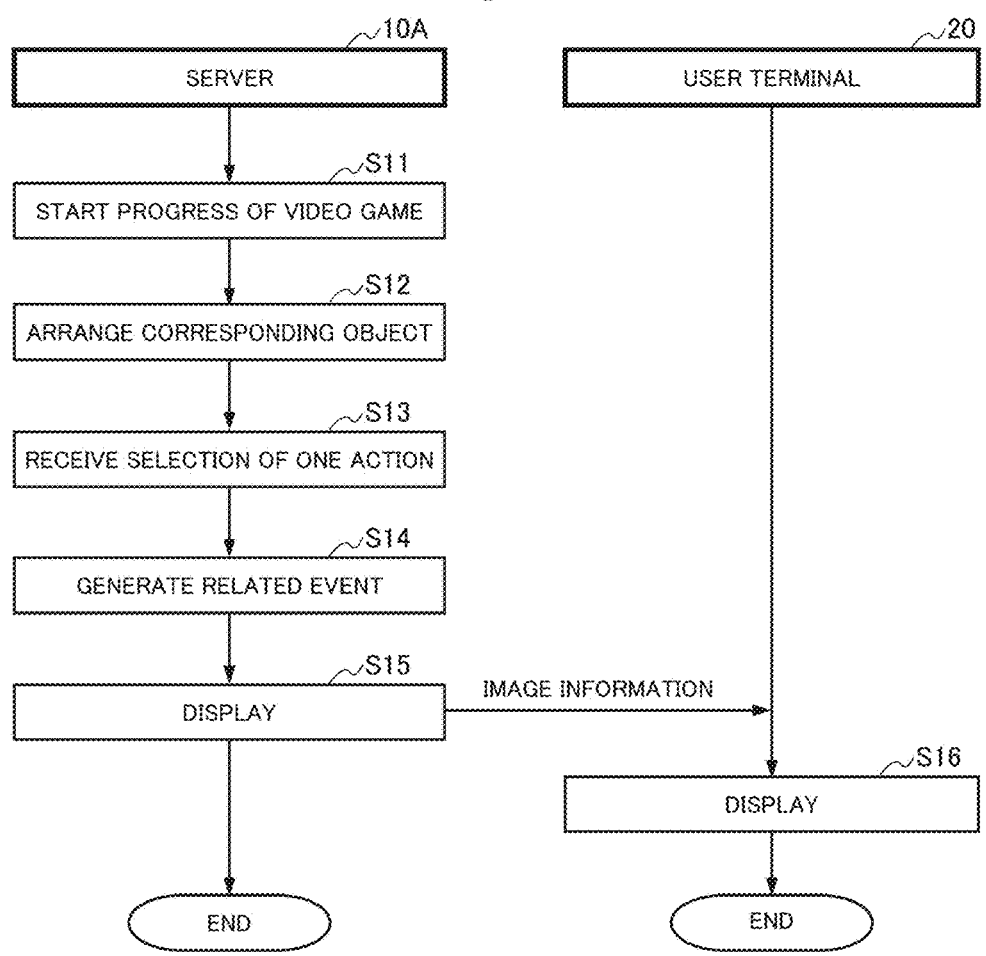
FIG. 3 is a flowchart showing an example of game related processing corresponding to at least one of the embodiments according to the present invention.

FIG. 3 is a flowchart showing an example of game related processing carried out by the system 100. Hereinafter, the case where data regarding the video game are transmitted and received by the server 10A and the terminal 20 will be described as an example. For example, the game related processing described above is periodically carried out at predetermined time intervals.

In the game related processing, in a case where a player character becomes a game continuation disabled state in a game space, the server 10A first starts progress of the video game by using the same character as or a different character from the player character that became the game continuation disabled state as a player character (Step S11). For example, the server 10A receives a user operation, and causes the same or different player character as or from the player character that became the game continuation disabled state to start progress of the video game.

The server 10A arranges a corresponding object corresponding to the player character that became the game continuation disabled state at a spot in the game space where the player character became the game continuation disabled state or in the vicinity of the spot (Step S12). At this time, the server 10A refers to a predetermined storage region, and associates the predetermined information regarding the player character that became the game continuation disabled state with the corresponding object.

The server 10A receives selection of one action from two or more kinds of predetermined actions corresponding to the corresponding object on the basis of a situation that the player character moves to the arranged position of the corresponding object or the vicinity thereof (Step S13).

Subsequently, the server 10A generates a related event related to the corresponding object on the basis of the selected one action and the predetermined information (Step S14). For example, the server 10A refers to a storage region in which predetermined information is stored; determines the related event on the basis of the selected one action and the predetermined information; and updates game data so that the determined related event is generated in the video game. Here, the game data mean the whole data that are used when the video game is caused to proceed.

Subsequently, the server 10A causes the terminal 20 to display a game image regarding the video game in which the related event is generated (Step S15). For example, the server 10A generates image information for causing the terminal 20 to display the game image, and transmits the generated image information to the terminal 20.

Subsequently, the terminal 20 displays the game image (Step S16), and terminates the processing herein. For example, the terminal 20 causes the display device thereof to display the game image of the display screen on the basis of the image information received from the server 10A.

Figure 4:
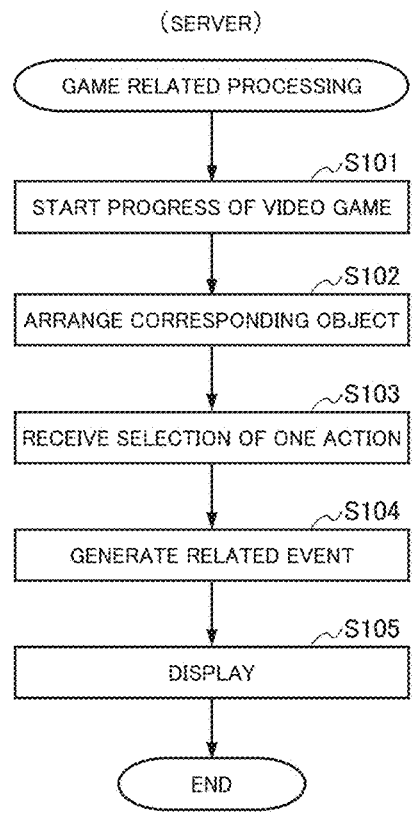
FIG. 4 is a flowchart showing an example of an operation of a server side in the game related processing corresponding to at least one of the embodiments according to the present invention.

FIG. 4 is a flowchart showing an example of an operation of the server 10A side in the game related processing. Here, an operation of the server 10A in the system 100 will be described again.

In the game related processing, in a case where a player character becomes a game continuation disabled state in a game space, the server 10A starts progress of the video game by using the same character as or a different character from the player character that became the game continuation disabled state as a player character (Step S101); arranges a corresponding object corresponding to the player character that became the game continuation disabled state at a spot in the game space where the player character became the game continuation disabled state or in the vicinity of the spot (Step S102); receives selection of one action from two or more kinds of predetermined actions corresponding to the corresponding object on the basis of a situation that the player character moves to the arranged position of the corresponding object or the vicinity thereof (Step S103); generates a related event related to the corresponding object on the basis of the selected one action and the predetermined information (Step S104); causes the terminal 20 to display a game image regarding the video game in which the related event is generated (Step S105), and terminates the processing herein.

Figure 5:
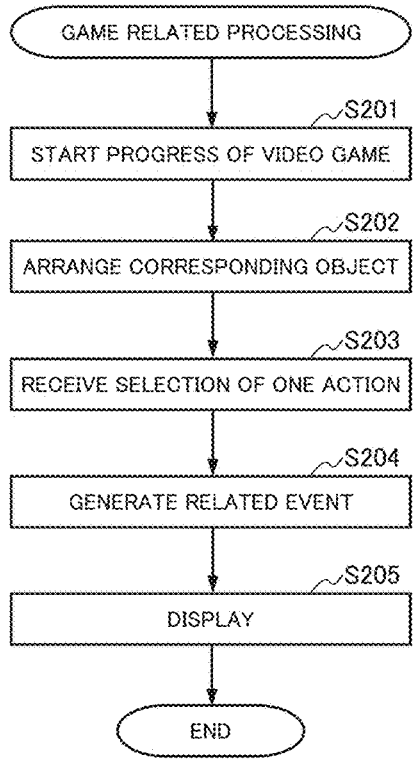
FIG. 5 is a flowchart showing an example of an operation of a terminal side in the game related processing corresponding to at least one of the embodiments according to the present invention.

FIG. 5 is a flowchart showing an operation of the terminal 20 in a case where the terminal 20 carries out the game related processing. Hereinafter, the case where the terminal 20 carries out the game related processing by a single body will be described as an example. In this regard, the terminal 20 is configured to include similar functions to those of the server 10. For this reason, its description will be omitted from a point of view to avoid repeated explanation.

In the game related processing, in a case where a player character becomes a game continuation disabled state in a game space, the terminal 20 starts progress of the video game by using the same character as or a different character from the player character that became the game continuation disabled state as a player character (Step S201); arranges a corresponding object corresponding to the player character that became the game continuation disabled state at a spot in the game space where the player character became the game continuation disabled state or in the vicinity of the spot (Step S202); receives selection of one action from two or more kinds of predetermined actions corresponding to the corresponding object on the basis of a situation that the player character moves to the arranged position of the corresponding object or the vicinity thereof (Step S203); generates a related event related to the corresponding object on the basis of the selected one action and the predetermined information (Step S204); displays a game image regarding the video game in which the related event is generated (Step S205); and terminates the processing herein.

As explained above, as one side of the first embodiment, the server 10A for controlling progress of the video game in the game space is configured so as to include the starting section 11, the arranging section 12, the receiving section 13, and the generating section 14. Thus, the starting section 11 starts, in a case where a player character becomes a game continuation disabled state in the game space, progress of the video game by using, as the player character, a character the same as or different from the player character that became the game continuation disabled state; the arranging section 12 arranges, as the object corresponding to the player character that became the game continuation disabled state, the corresponding object, with which the predetermined information regarding the player character that became the game continuation disabled state is associated, at the spot of the game space where the player character became the game continuation disabled state or in the vicinity of the spot; the receiving section 13 receives selection of one action from the two or more kinds of predetermined actions corresponding to the corresponding object on the basis of a situation that the player character moves to the arranged position of the corresponding object or the vicinity thereof; and the generating section 14 generates the related event related to the corresponding object in the video game on the basis of the selected one action and the predetermined information. Therefore, it is possible to increase the range of progress of the video game by using a situation that the player character became the game continuation disabled state, and to improve interest in or the taste of the video game.

Second Embodiment

Figure 6:
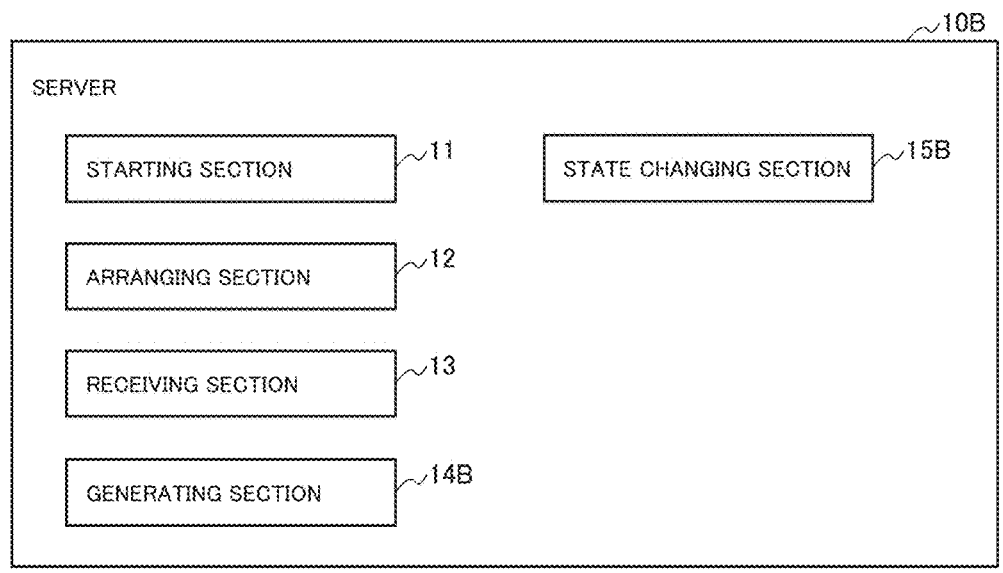
FIG. 6 is a block diagram showing a configuration of a server corresponding to at least one of the embodiments according to the present invention.

FIG. 6 is a block diagram showing a configuration of a server 10B, which is an example of the server 10. In the present embodiment, the server 10B at least includes a starting section 11, an arranging section 12, a receiving section 13, a generating section 14B, and a state changing section 15B (which corresponds to one example of a state changing function).

The state changing section 15B has a function to change a state of a corresponding object in accordance with elapse of a time. Here, the state of the corresponding object means a state, condition or status of the corresponding object on each occasion. As one example of the configuration to change the state of the corresponding object in accordance with elapse of a time, there is a configuration in which the corresponding object is in a state of a first stage until one hour elapses since the corresponding object is arranged, the corresponding object is in a state of a second stage until three hours elapse after one hour elapses, and the corresponding object is in a state of a third stage until the corresponding object disappears after three hours elapse. More specifically, as examples of the state of the corresponding object, there are a "normal state" corresponding to the first stage described above, a "rotten state" corresponding to the second stage described above, and a "polluted state" corresponding to the third stage described above.

The generating section 14B has a function to generate a related event in a video game on the basis of one action that is selected, predetermined information, and the state of the corresponding object. Namely, in the second embodiment, the state of the corresponding object influences on the related event to be generates. For example, the generating section 14B refers to the state of the corresponding object when an event to be generated is determined, and determines the event to be generated. More specifically, as an example of the related event to be generated, there is an event in which when the action called "repair" is selected in a state where the state of the corresponding object is in the "normal state" or "rotten state" described above, a character corresponding to the corresponding object becomes an ally (or a friend). Further, as another example, there is an event in which when the action called "repair" is selected in a state where the state of the corresponding object is in the "polluted state" described above, a character corresponding to the corresponding object becomes an enemy character and a battle between the corresponding object and the enemy character is started.

Figure 7:
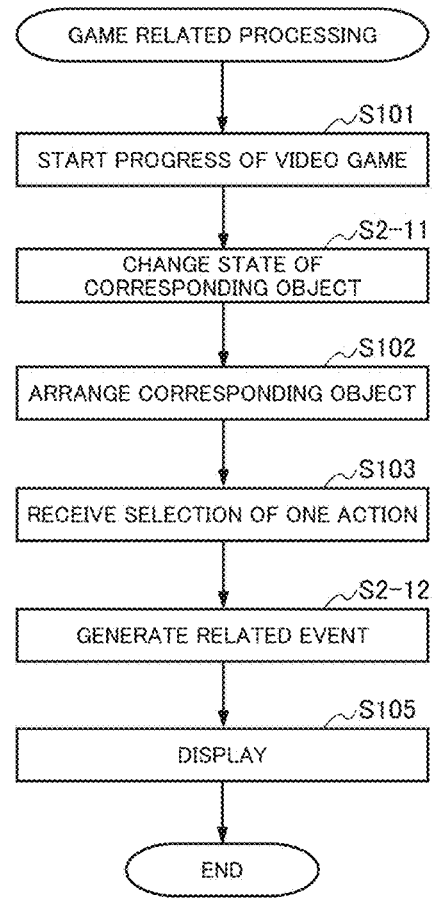
FIG. 7 is a flowchart showing an example of the game related processing corresponding to at least one of the embodiments according to the present invention.

FIG. 7 is a flowchart showing an example of the game related processing carried out by the system 100. Hereinafter, an operation of the server 10B side will be described as an example. In this regard, description of components or portions that have already been explained will be omitted from a point of view to avoid repeated explanation.

In the game related processing, when the server 10B starts progress of the video game (Step S101), the server 10B changes a state of a corresponding object in accordance with elapse of a time (Step S2-11). For example, the server 10B determines presence or absence of a corresponding object whose state is to be changed. In a case where it is determined that there is a corresponding object whose state is to be changed, the server 10B changes the state of the corresponding object, and updates game data.

Subsequently, the server 10B arranges the corresponding object corresponding to a player character that became a game continuation disabled state at a spot in the game space where the player character became the game continuation disabled state or in the vicinity of the spot (Step S102); receives selection of one action (Step S103); and generates a related event on the basis of the selected one action, the predetermined information, and the state of the corresponding object (Step S2-12).

As explained above, as one side of the second embodiment, the server 10B is configured so as to at least include the starting section 11, the arranging section 12, the receiving section 13, the generating section 14B, and the state changing section 15B. Thus, the state changing section 15B changes the state of the corresponding object in accordance with elapse of the time; and the generating section 14B generates the related event in the video game on the basis of the selected one action, the predetermined information and the state of the corresponding object. Therefore, it is possible to provide a huge variety of elements in progress of the video game. This makes it possible to increase the range of progress of the video game, and to improve interest in or the taste of the video game.

Namely, as one side of the second embodiment, the server 10B is configured so that: the state changing section 15B changes the state of the arranged object on the basis of the player character that became the game continuation disabled state; and the generating section 14B generates an event according to the state. Therefore, it is possible to provide a huge variety of elements in progress of the video game. This makes it possible to increase the range of progress of the video game, and to improve interest in or the taste of the video game.

Third Embodiment

Figure 8:
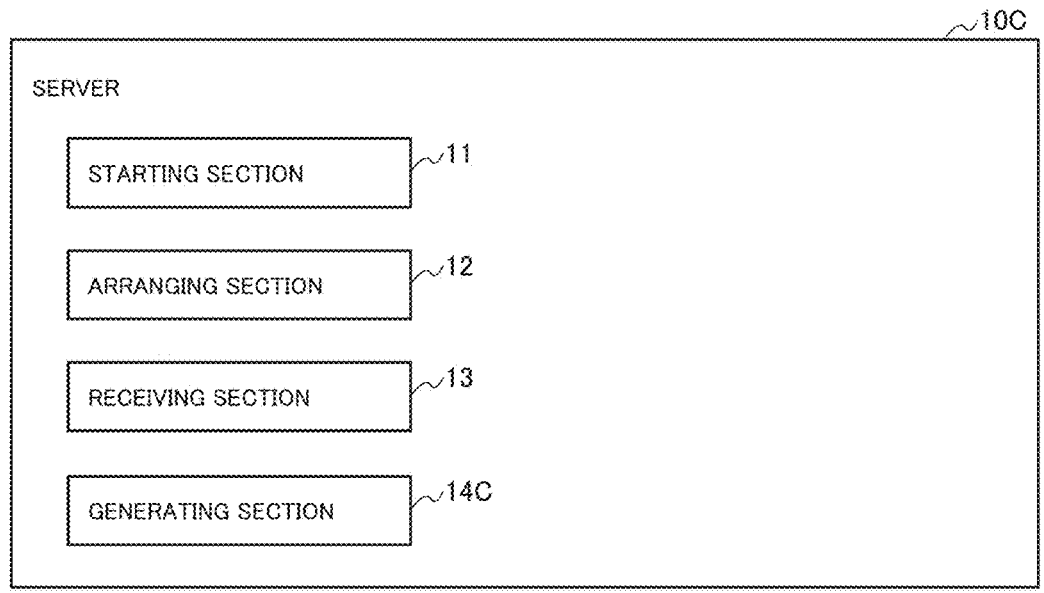
FIG. 8 is a block diagram showing a configuration of a server corresponding to at least one of the embodiments according to the present invention.

FIG. 8 is a block diagram showing a configuration of a server 10C, which is an example of the server 10. In the present embodiment, the server 10C at least includes a starting section 11, an arranging section 12, a receiving section 13, and a generating section 14C.

The generating section 14C has a function to generate a related event in which a predetermined privilege based on predetermined information is given in a case where one action thus selected is a first action. A target to which the predetermined privilege is given is a user who selects the first action or the player character operated by the user. Here, the privilege means a benefit that is given specially. It is preferable that an example of the privilege based on the first action is one that has an advantageous action or effect on the user. As examples of the privilege based on the first action, there are an effect that influences on the user in anyway (for example, release of a buff or a new skill), an effect that influences on a quest or stage in anyway (for example, release of a buff or a new stage), an in-game element that the user can use (for example, an item or character), and the like.

Figure 9:
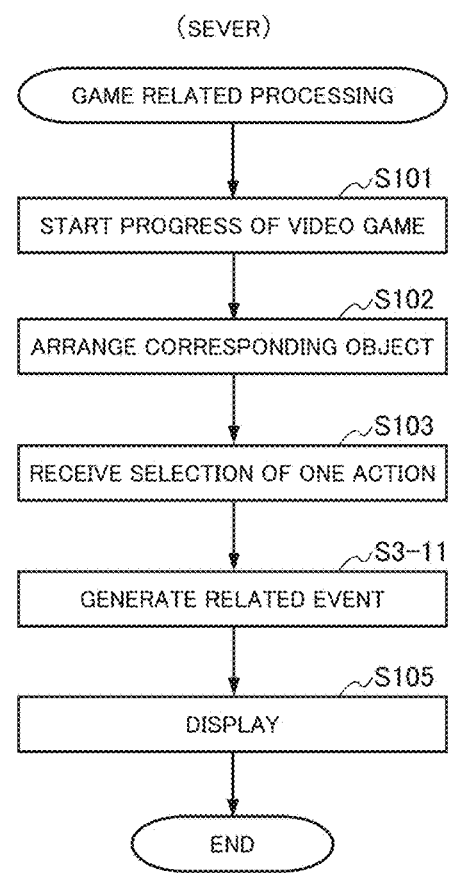
FIG. 9 is a flowchart showing an example of the game related processing corresponding to at least one of the embodiments according to the present invention.

FIG. 9 is a flowchart showing an example of the game related processing carried out by the system 100. Hereinafter, operations of the server 10C and the terminal 20 will be described as an example. In this regard, description of components or portions that have already been explained will be omitted from a point of view to avoid repeated explanation.

The server 10C receives selection of one action (Step S103). In a case where the one action is the first action, the server 10C generates the related event in which the predetermined privilege based on the predetermined information is given (Step S3-11). For example, the server 10C refers to information that is defined so that an event corresponding to the first action is an event in which the predetermined privilege based on the predetermined information is given, and generates the related event based on the one action. As a more concrete example, the server 10C generates a related event in which the player character is caused to obtain an experience value on the basis of the predetermined information that contains information regarding an experience value obtained until the character that became the game continuation disabled state becomes the game continuation disabled state equivalent to the experience value.

As explained above, as one side of the third embodiment, the server 10C is configured so as to at least include the starting section 11, the arranging section 12, the receiving section 13, and the generating section 14C. Thus, in a case where the selected one action is the first action, the generating section 14C generates the related event in which the predetermined privilege based on the predetermined information is given to the user who selects the first action or the player character operated by the user. Therefore, it is possible to increase the range of progress of the video game by using a situation that the player character became the game continuation disabled state, and to improve interest in or the taste of the video game.

Fourth Embodiment

Figure 10:
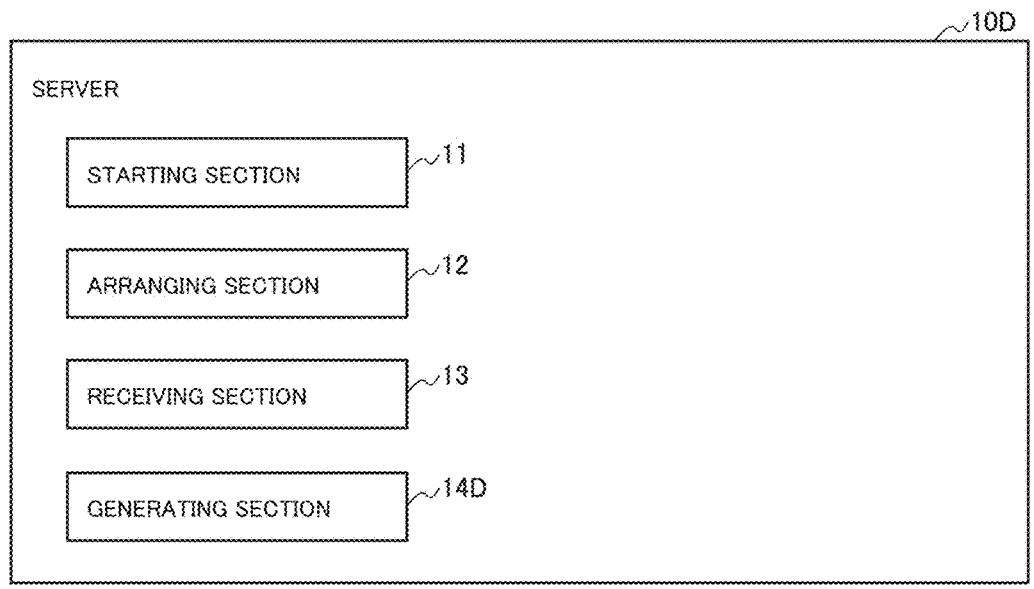
FIG. 10 is a block diagram showing a configuration of a server corresponding to at least one of the embodiments according to the present invention.

FIG. 10 is a block diagram showing a configuration of a server 10D, which is an example of the server 10. In the present embodiment, the server 10D at least includes a starting section 11, an arranging section 12, a receiving section 13, and a generating section 14D.

The generating section 14D has a function to generate a related event, in which an ally character corresponding to a corresponding object appears in a game space, in a case where one action thus selected is a second action and a state of the corresponding object is a first state. On the other hand, the generating section 14D has a function to generate a related event, in which an enemy character corresponding to the corresponding object appears in the game space in a case where the selected one action is the second action but the state of the corresponding object is a second state. Here, the server 10D may be configured so that each of the first state and the second state includes a plurality of stages. Namely, the system 100 may be configured so that, in a case where the state of the corresponding object is indicated by any of four stages from a first stage to a fourth stage, the state of the corresponding object from the first stage to the second stage is classified into the first state.

Figure 11:
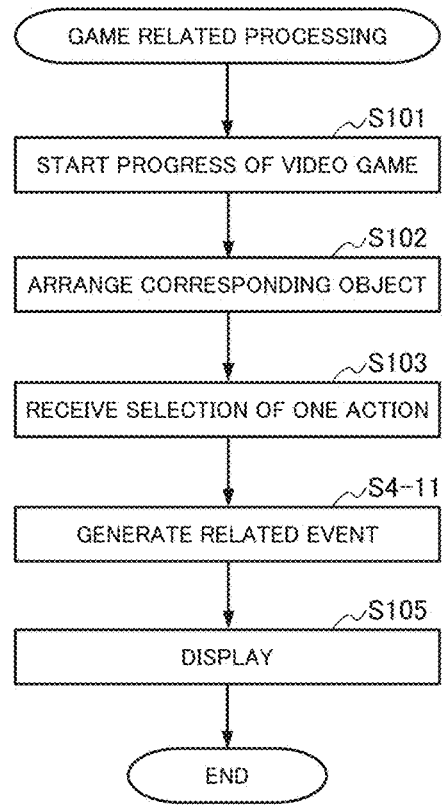
FIG. 11 is a flowchart showing an example of the game related processing corresponding to at least one of the embodiments according to the present invention.

FIG. 11 is a flowchart showing an example of the game related processing carried out by the system 100. Hereinafter, an operation of the server 10D and the terminal 20 will be described as an example. In this regard, description of components or portions that have already been explained will be omitted from a point of view to avoid repeated explanation.

The server 10D receives selection of one action (Step S103). In a case where the one action is the second action, the server 10D generates a related event, in which an ally character corresponding to the corresponding object appears in the game space, or a related event, in which an enemy character corresponding to the corresponding object appears in the game space, on the basis of the state of the corresponding object (Step S4-11). For example, the server 10D refers to information that is defined so that an event associated with the second action and the first state is set to the event in which the ally character corresponding to the corresponding object appears in the game space and an event associated with the second action and the second state is set to the event in which enemy character corresponding to the corresponding object appears in the game space, and generates a related event based on the one action. As a concrete example of the first state, there is the case where a state of the corresponding object is in the "normal state" or "rotten state" described above. Further, as a concrete example of the second state, there is the case where a state of the corresponding object is in the "polluted state" described above.

As explained above, as one side of the fourth embodiment, the server 10D is configured so as to at least include the starting section 11, the arranging section 12, the receiving section 13, and the generating section 14D. Thus, the generating section 14D generates an event, in which an ally character corresponding to the corresponding object appears in the game space, as the related event in a case where the selected one action is the second action and the state of the corresponding object is the first state; and the generating section 14D generates an event, in which an enemy character corresponding to the corresponding object appears in the game space, as the related event in a case where the selected one action is the second action and the state of the corresponding object is the second state. Therefore, it is possible to increase the range of progress of the video game, and improve interest in or the taste of the video game.

Namely, as one side of the fourth embodiment, the server 10D is configured so as to diversify an event, which is generated in accordance with a state of an object arranged on the basis of a player character that became a game continuation disabled state. Therefore, it is possible to increase the range of progress of the video game, and to improve interest in or the taste of the video game.

Fifth Embodiment

Figure 12:
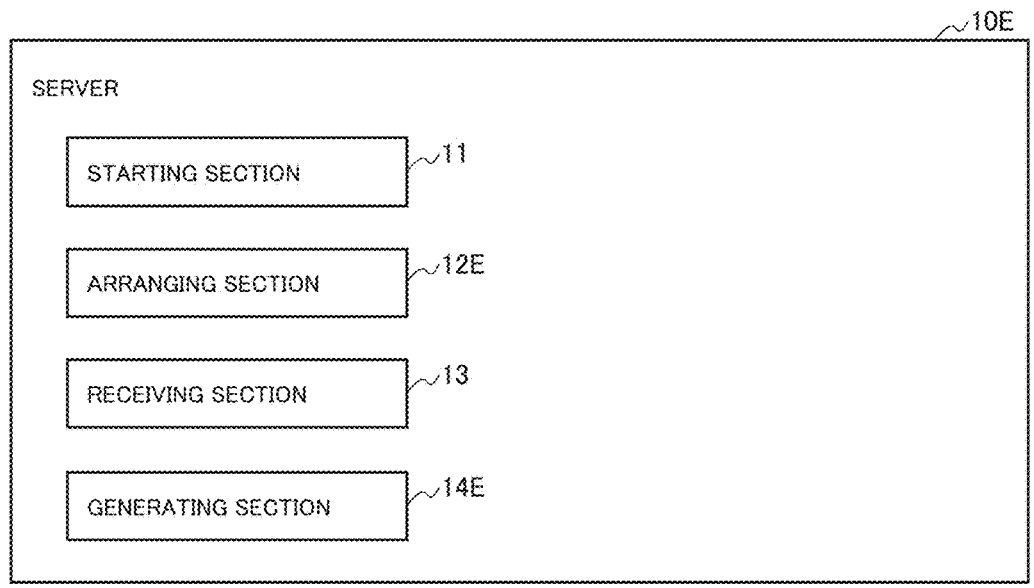
FIG. 12 is a block diagram showing a configuration of a server corresponding to at least one of the embodiments according to the present invention.

FIG. 12 is a block diagram showing a configuration of a server 10E, which is an example of the server 10. In the present embodiment, the server 10E at least includes a starting section 11, an arranging section 12E, a receiving section 13, and a generating section 14E.

The arranging section 12E has a function to contain identification information in predetermined information. A user who operates a player character, which became a game continuation disabled state, is specified by the identification information. Namely, a corresponding object that is arranged in a game space is associated with the identification information by which the user who operates the player character, which corresponds to the corresponding object and became the game continuation disabled state, is specified.

The generating section 14E has a function to generate a related event whose content for the same action is different between the case where a user who selects one action is the same as the user who operates the player character that became the game continuation disabled state and the case where the users are not the same as each other. The phrase "the users are the same as each other" herein contains the case where a user ID of the user who selects the one action matches a user ID of the user who operates the player character that became the game continuation disabled state. Further, the phrase "generate a related event whose content for the same action is different a related event whose content for the same action is different" means that a related event having different content is generated as a result of a situation that the same action is selected.

Figure 13:
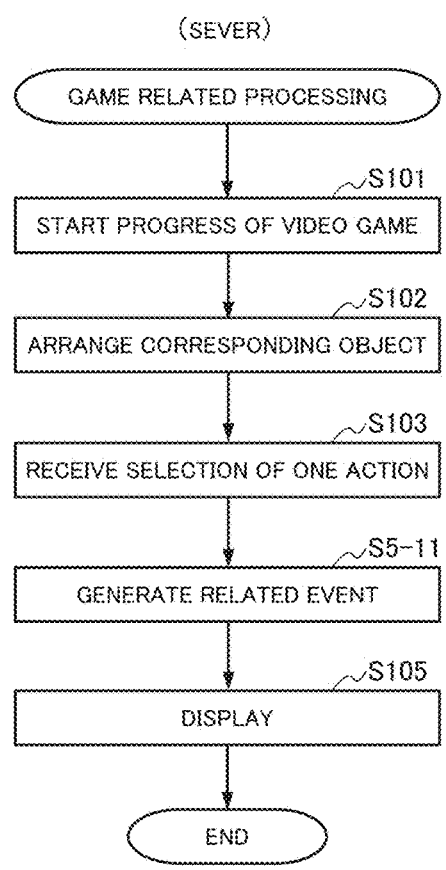
FIG. 13 is a flowchart showing an example of the game related processing corresponding to at least one of the embodiments according to the present invention.

FIG. 13 is a flowchart showing an example of the game related processing carried out by the system 100. Hereinafter, an operation of the server 10E and the terminal 20 will be described as an example. In this regard, description of components or portions that have already been explained will be omitted from a point of view to avoid repeated explanation.

The receives selection of one action (Step S103). The server 10E generates a related event whose content for the same action is different between the case where a user who selects one action is the same as a user who operates the player character that became the game continuation disabled state and the case where the users are not the same as each other (Step S5-11). For example, the server 10E refers to information that is defined so that content of an event to be generated is different between the case where the user who selects the one action is the same as the user who operates the player character that became the game continuation disabled state and the case where the user who selects the one action is the same as the user who operates the player character that became the game continuation disabled state; and generates the related event based on the one action. As a more concrete example, in a case where a user A selects an action A and the user who operates the player character that became the game continuation disabled state is the user A, a related event A is generated. On the other hand, in a case where the user A selects the action A and the user who operates the player character that became the game continuation disabled state is a user B, a related event B is generated.

As explained above, as one side of the fifth embodiment, the server 10E is configured so as to at least include the starting section 11, the arranging section 12E, the receiving section 13, and the generating section 14E. Thus, the generating section 14E generates the related event whose content for the same action is different between the case where a user who selects the one action is the same as the user who operates the player character that became the game continuation disabled state and the case where the users are not the same as each other. Therefore, it is possible to increase the range of progress of the video game, and to improve interest in or the taste of the video game.

Namely, as one side of the fifth embodiment, the server 10E is configured so as to: change content of an event to be generated in accordance with whether a user who carries out an action is the same as a user who operates a corresponding object (or a player character corresponding to the corresponding object) against which the action is carried out or not in a case where the video game is caused to proceed by a plurality of users; and thereby diversify the event to be generated. Therefore, it is possible to increase the range of progress of the video game, and to improve interest in or the taste of the video game.

Sixth Embodiment

A system according to the present embodiment can be applied to a multi-player video game in which a plurality of users can participate, a solo-player video game played by one user, and the like. Hereinafter, in particular, the multi-player video game (hereinafter, referred to simply as a "video game") will be described. An outline thereof will first be described.

The plurality of users respectively operates a plurality of user terminals of the plurality of users, and respectively causes player characters of the plurality of users to move or actuate within the same one virtual space. Here, the virtual space means a game space in which characters of the video game virtually exist. The configuration of the virtual space is not limited particularly so long as a game screen can be generated. As examples of the virtual space, there are a two-dimensional space and a three-dimensional space. Further, it is preferable that the plurality of player characters respectively operated by the users of the plurality of user terminals is arranged and allowed to move in the virtual space. The player character operated by each of the users of the user terminals and non-player characters that are not operated by any user are allowed to move within the virtual space. The player character is an android that is constituted by a body, which is called as an "artificial body", and the like. In the present embodiment, the player character may be called as "artificial body". An ally character (or a friend character), an enemy character, and the other characters are included in the non-player characters. Here, the ally character is a character that becomes a character of an ally of the user and is allowed to carry out various kinds of actions automatically (that is, by AI without receiving a direct operation of the user). Further, the enemy character means a character that becomes an opponent of the player character for which progress of the video game is started, and means a character whose action such as an attack is controlled on the basis of predetermined AI. Further, a character that introduces settings of a story, a character that provides service to the player character, and the like are included in the other character. Further, the player character that became the game continuation disabled state in the game space and the player character that causes the video game mentioned herein include the case where the player characters are artificial bodies operated by the same user and the case where the player characters are artificial bodies respectively operated by different users. Moreover, the player character that became the game continuation disabled state in the game space and the player character that causes the video game mentioned herein includes the case where each of the player characters has the same artificial body and the case where the player characters respectively have different artificial bodies.

The artificial body can be equipped with any of various kinds of in-game elements. Here, the in-game element means an element that the user can utilize in the video game. The configuration of the in-game element is not limited particularly. However, it is preferable that the configuration is a configuration in which the user can virtually equip (or set) a plurality of in-game elements with (or to) the artificial body. As examples of the in-game element, there are a skill, an item, a character and the like. As examples of the item, there are a "chip", a "weapon" and the like. The artificial body equipped with the chip can obtain various kinds of effects in accordance with the equipped chip. For example, the artificial body equipped with the chip can obtain an effect that a parameter set to the artificial body is improved, an effect that information useful for capture of the video game (for example, destination information, enemy status information and the like) is displayed, an effect that a drop probability of an item is improved, and the like.

Figure 20A:
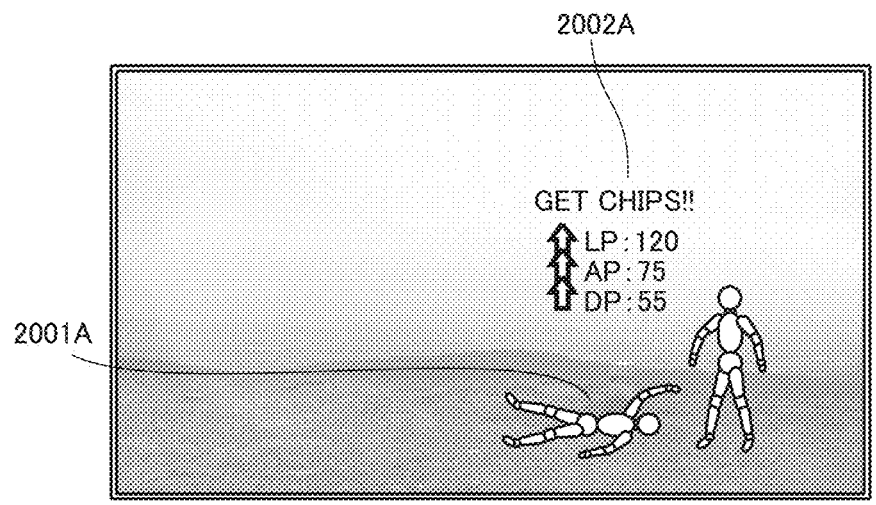
FIGS. 20A-20C are explanatory drawings for explaining a concept corresponding to at least one of the embodiments according to the present invention.

When a parameter associated with the artificial body satisfies a predetermined condition (for example, a life (LP) thereof becomes zero) in accordance with progress of the video game, the artificial body becomes the game continuation disabled state, whereby it is impossible to continue the video game by operating the artificial body that became the game continuation disabled state. In other words, the artificial body becomes a dying state. After the artificial body became the dying state, the user who operated the dead artificial body can start (or restart) the video game by using an artificial body that takes over predetermined information from the artificial body that became the game continuation disabled state (in the present embodiment, referred to as a "new artificial body"). On the other hand, a corresponding object corresponding to the artificial body that became the game continuation disabled state (in the present embodiment, referred to also as a "former artificial body") is arranged within the virtual space. In other words, the former artificial body expresses an artificial body that cannot move. For example, a former artificial body 2001A having the similar form to that of an artificial body as shown in FIG. 20A (will be described later) is arranged. In this regard, in a case where the user has a plurality of artificial bodies with the same form, an artificial body corresponding to a former artificial body may become the same as a new artificial body.

Part or all of player character information up to a time when a corresponding artificial body becomes a game continuation disabled state is associated with the former artificial body arranged in the virtual space as the predetermined information. Then, the predetermined information thus associated with the former artificial body is utilized in each of various kinds of events. Further, a state of the former artificial body changes with elapse of a time. A first stage is a "normal state", a second stage is a "rotten state", and a third stage is a "polluted state". When a time further elapses since the third stage, the former artificial body results in disappearance as a final stage (that is, a fourth stage). The part or all of the player character information described above, information on the state of the former artificial body (state information), and the like are managed as former artificial body information (see FIG. 16). In this regard, in the present embodiment, the state of the former artificial body is constituted by four stages from the first stage to the fourth stage. However, the server may be configured so that the stage shifts directly to the fourth stage (that is, the former artificial body disappears) after the second stage without the third stage. Alternatively, the server may be configured so that one or more stage is further provided. The state of the former artificial body is appropriately displayed in a mode in which each of the users can recognize it. As examples of a displaying method, a method of changing appearance of the corresponding object, a method of displaying a specific icon indicating the state of the corresponding object, or the like is used.

The "new artificial body operated by the user who operated the artificial body corresponding to the former artificial body", or an "artificial body operated by another user" can access the former artificial body. Specifically, when the artificial body moves to a spot at which the former artificial body is arranged or the vicinity thereof, any or some of various kinds of actions can be carried out against the former artificial body. A first action that is one kind of the various kinds of actions is "collection". A second action that is one kind of the various kinds of actions is "repair". In the present embodiment, when the artificial body operated by the user moves to an arranged position of the former artificial body or the vicinity thereof so that the user can select any action, choices for causing the user to select either collection or repair is displayed on a game screen.

When the collection is selected, various kinds of privileges are given on the basis of information associated with the former artificial body. As examples of the privileges given by the collection, there are recovery of a life, obtaining of an experience value, obtaining of gold, obtaining of a chip or a weapon set to the artificial body that became the former artificial body, and the like. Further, "collection" can be carried out for a former artificial body of other user. When the collection is carried out for the former artificial body of other user, a privilege in which restriction is partially added compared with the privilege according to the collection to the former artificial body corresponding to his or her own artificial body is given. For example, restriction may partially be added by setting an effect of a chip so that time restriction is provided thereto. Further, the privilege by the collection varies depending upon the state of the former artificial body. For example, in a case where the amount of the privilege given when the former artificial body is in the normal state is 100%, the amount of the privilege given when to be in the rotten state is reduced to 70%, and the amount of the privilege given when to be in the polluted state is further reduced to 30%. Namely, in order to obtain a large effect by means of the collection, it is required to quickly collect the former artificial body.

On the other hand, when repair is selected, the repaired former artificial body becomes an ally character or an enemy character. Whether to become the ally character or enemy character is determined by the state of the former artificial body. In a case where the state of the former artificial body is a normal state or a rotten state, the repaired former artificial body becomes the ally character. On the other hand, in a case where the state of the former artificial body is a polluted state, the repaired former artificial body becomes the enemy character. In the present embodiment, selection of the repair can be carried out as a condition that a specific in-game element is consumed.

Strength of the former artificial body that became the ally character or enemy character by carrying out the repair influences on various kinds of elements. Here, the various kinds of elements are contained in the predetermined information of the former artificial body information. For example, a type of an attack of the former artificial body that became the ally character or the enemy character is determined in accordance with an equipped weapon at the time when the artificial body, which became the game continuation disabled state, corresponding to the former artificial body becomes the game continuation disabled state (which includes a time when to become the former artificial body. The same applies hereinafter.). Further, various kinds of parameters for the ally character or the enemy character and intelligence of the AI (that is, the degree of difficulty) are determined in accordance with actions that have been carried out at the time when the artificial body, which became the game continuation disabled state, corresponding to the former artificial body becomes the game continuation disabled state, for example. Specifically, a plurality of stages is contained in the intelligence of the AI. Which stage is selected or determined is determined on the basis of the obliterate number of enemies, a play time with the artificial body, and the like. In this regard, with respect to information regarding the obliterate number of enemies and the play time with the artificial body, a server 10Z obtains them by referring to predetermined information contained in the former artificial body information that is stored in a storing section 17Z (will be described later).

Figures 14, 15:
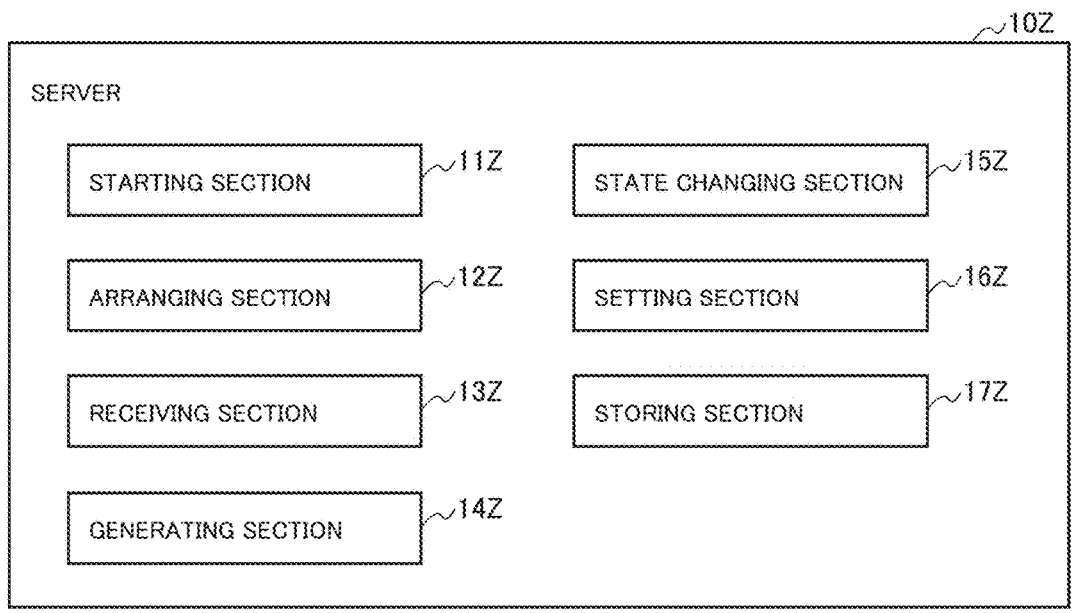
FIG. 14 is a block diagram showing a configuration of a server corresponding to at least one of the embodiments according to the present invention.
FIG. 15 is an explanatory drawing for explaining an example of a storage state of information corresponding to at least one of the embodiments according to the present invention.

FIG. 14 is a block diagram showing a configuration of a server 10Z, which is an example of the server 10 in the system 100 (see FIG. 1). In the present embodiment, the server 10Z at least includes a starting section 11Z, an arranging section 12Z, a receiving section 13Z, a generating section 14Z, a state changing section 15Z, a setting section 16Z, and a storing section 17Z.

The starting section 11Z has a function to start progress of the video game in the game space in which the former artificial body is arranged. As one example of a configuration to start progress of the video game, there is a configuration in which continuation is selected after the artificial body becomes the game continuation disabled state and progress of the video game is newly restarted from a predetermined position in the game space at which the former artificial body is arranged. In the video game that is newly started in the present embodiment, an artificial body different from the artificial body corresponding to the former artificial body is used. However, the video game is not limited to such a configuration. The server 10Z may be configured so as to newly restart progress of the video game by using the same artificial body as the artificial body corresponding to the former artificial body. The phrase "start (or restart) progress of the video game" mentioned herein is not limited to the case where the video game is newly restarted in the game space in which a former artificial body corresponding to the user's own artificial body is arranged. Such a phrase includes "the case where the video game is started in the game space in which the former artificial body of the user's own artificial body is not arranged but a former artificial body of an artificial body of another user is arranged" and "the case where a former artificial body of an artificial body of another user is arranged in a game space during progress of the video game and the progress of the video game is continued in the game space".

The arranging section 12Z has a function to arrange the former artificial body, which corresponds to the artificial body that became the game continuation disabled state, in the game space. In the present embodiment, the arranging section 12Z refers to a spot where the player character became the game continuation disabled state, and updates game data (in particular, the former artificial body information) so that the former artificial body associated with the predetermined information is arranged at the spot or the vicinity of the spot. Here, the phrase "become the game continuation disabled state" means that a predetermined parameter associated with the operated artificial body becomes a predetermined value. As one example of the case of becoming the game continuation disabled state, there is a state where a life point associated with an artificial body becomes zero and the artificial body dies. Here, the game data contain the whole data that are utilized to cause the video game to proceed. In particular, the game data contain information that is changed in accordance with progress of the video game. As examples of the game data, there are the former artificial body information, user related information, information regarding the game space, information regarding movement of an ally character or an enemy character, information regarding parameters of the ally character and the enemy character, and the like.

The receiving section 13Z has a function to receive an input for generating an event for the former artificial body in a case where the artificial body moves to the vicinity of the former artificial body. As an example of the configuration to receive an input, there is a configuration in which a selection image in which at least two or more choices for the action are presented so as to be capable of selecting any one of them is displayed and a selection input for a choice is received. In the present embodiment, the collection (the first action) and the repair (the second action) are set as the selectable actions, but three or more kinds of actions may be set.

The generating section 14Z has a function to generate an event related to the former artificial body (hereinafter, referred to as a "related event") on the basis of the selected one action and the predetermined information. Specifically, the generating section 14Z determines an event generated on the basis of the selected one action, a predetermined variable element, and event information, and updates the game data so as to generate the determines event. Here, the event means an incident or occurrence that is generated in the video game. Further, an event that directly generates an advantageous effect for the user, and an event that does not always generate an advantageous effect for the user are included in the related event. As examples of the related event that directly generates an advantageous effect for the user, there are one in which a parameter set to an artificial body is improved (for example, a life is recovered), one in which information useful for capture of the video game (for example, the destination information, the enemy status information and the like) is displayed, one in which a drop probability of an in-game element (for example, a chip, a weapon and the like) is improved, and one in which a repaired former artificial body becomes an ally character. On the other hand, as one example of the related event that does not always generate an advantageous effect for the user, there is one in which a repaired former artificial body becomes an enemy character.

The state changing section 15Z has a function to change a state of the former artificial body in a stepwise manner with elapse of a time. In the present embodiment, the state changing section 15Z updates information indicating the state of the former artificial body in accordance with elapse of a time, whereby the state of the former artificial body is changed. The state of the former artificial body is changed in order of a normal state, a rotten state, a polluted state, and a disappear state. Namely, the state of the former artificial body is configured so that the state is deteriorated with elapse of a time (or value of the state is reduced). A time until the state is changed is determined in accordance with a predetermined condition. As examples of the predetermined condition, there are an item with which the artificial body corresponding to the former artificial body is equipped (that is, a chip, a weapon and the like with which the player character that became the game continuation disabled state has been equipped until the player character becomes the game continuation disabled), a state of the game space, and the like. In this regard, the server 10Z may be configured so that, in a case where a state of a former artificial body is changed to the disappear state, former artificial body information corresponding to the former artificial body is erased. Alternatively, the server 10Z may be configured so that: even in a case where a state of a former artificial body is changed to the disappear state, former artificial body information corresponding to the former artificial body is not erased; and in a case where a predetermined condition is satisfied in addition to the condition of changing to the disappear state, the former artificial body information corresponding to the former artificial body is erased. In this regard, the former artificial body information will be described later in detail.

The setting section 16Z has a function to set an in-game element to an artificial body in response to an instruction of a user. For example, the setting section 16Z has a function to set the in-game element such as a chip and a weapon to the artificial body in response to an operation of the user, and to update player character information.

The storing section 17Z is a storage medium for storing various kinds of information that are used for progress of the video game. The user related information, the former artificial body information, and the event information are stored in the storing section 17Z according to the present embodiment. In this regard, as the configuration in which the various kinds of information are stored in the storing section 17Z, the server 10Z may be configured so that a user related information storing section, a former artificial body information storing section, and an event information storing section are included in the storing section 17Z.

FIG. 15 is an explanatory drawing for explaining an example of a storage state of the user related information. Here, the user related information means information of the user, which is related to the video game. As shown in FIG. 15, the user related information contains user information regarding users and player character information regarding an artificial body operated by each of the users. A user ID for uniquely specifying the user and possession information regarding an item and a skill possessed by the user are contained in the user information. Further, an artificial body ID for uniquely specifying an artificial body to be operated, action history information that indicates an action history of the artificial body, and various kinds of parameters are contained in the player character information.

FIG. 16 is an explanatory drawing for explaining an example of a storage state of the former artificial body information. Here, the former artificial body information means information related to former artificial bodies each of which is to be arranged or has been arranged in the virtual space. The former artificial body information contains a former artificial body ID for uniquely specifying the former artificial body, state information related to a state of the former artificial body, positional information thereof, and predetermined information thereof. Here, information indicating a stage of the state of the former artificial body, information on a time when the state is to be updated are contained in the state information. Further, the predetermined information is information for determining the content of the related event, and is generated on the basis of the player character information. A user ID for specifying the user who operates the artificial body corresponding to the former artificial body, the action history information regarding the action history of the artificial body corresponding to the former artificial body, setting information regarding an in-game element or in-game elements set to the artificial body corresponding to the former artificial body, parameter information regarding a parameter or parameters of the artificial body that becomes the game continuation disabled state, and the like are contained in the predetermined information. Specifically, as shown in FIG. 16, a time until a former artificial body becomes a game continuation disabled state, the obliterate number of enemy characters until the former artificial body becomes the game continuation disabled state, and the like are contained therein as the action history information of the former artificial body information. Further, chip information, weapon information and the like are contained therein as the setting information. Further, information on the life point, the experience value, the gold and the like is contained therein as the parameter information. Further, the state information and the predetermined information of the former artificial body information become variable elements for specifying an event. In this regard, in a case where a user terminal causes the video game to proceed by a single body (that is, in a case where the video game is caused to proceed with so-called offline), a former artificial body that is arranged during progress of the video game in the user terminal may be managed. Therefore, the user terminal may be configured so as to store former artificial body information regarding only the user's own former artificial body. Namely, in a case where the video game is caused to proceed with the offline, the user ID for specifying the user who operates the artificial body corresponding to the former artificial body of the information contained in the predetermined information may not be associated with the predetermined information.

FIG. 17 is an explanatory drawing for explaining an example of a storage state of the event information. Here, the event information means information for determining an event. A generation condition and an effect of an event are associated with the event information. As shown in FIG. 17, a condition regarding an action, a condition regarding a state of a former artificial body, and a condition of whether the user ID associated with the former artificial body is the same as the user ID of the user who carried out a selection operation or not are contained in the generation condition.

Figure 18:
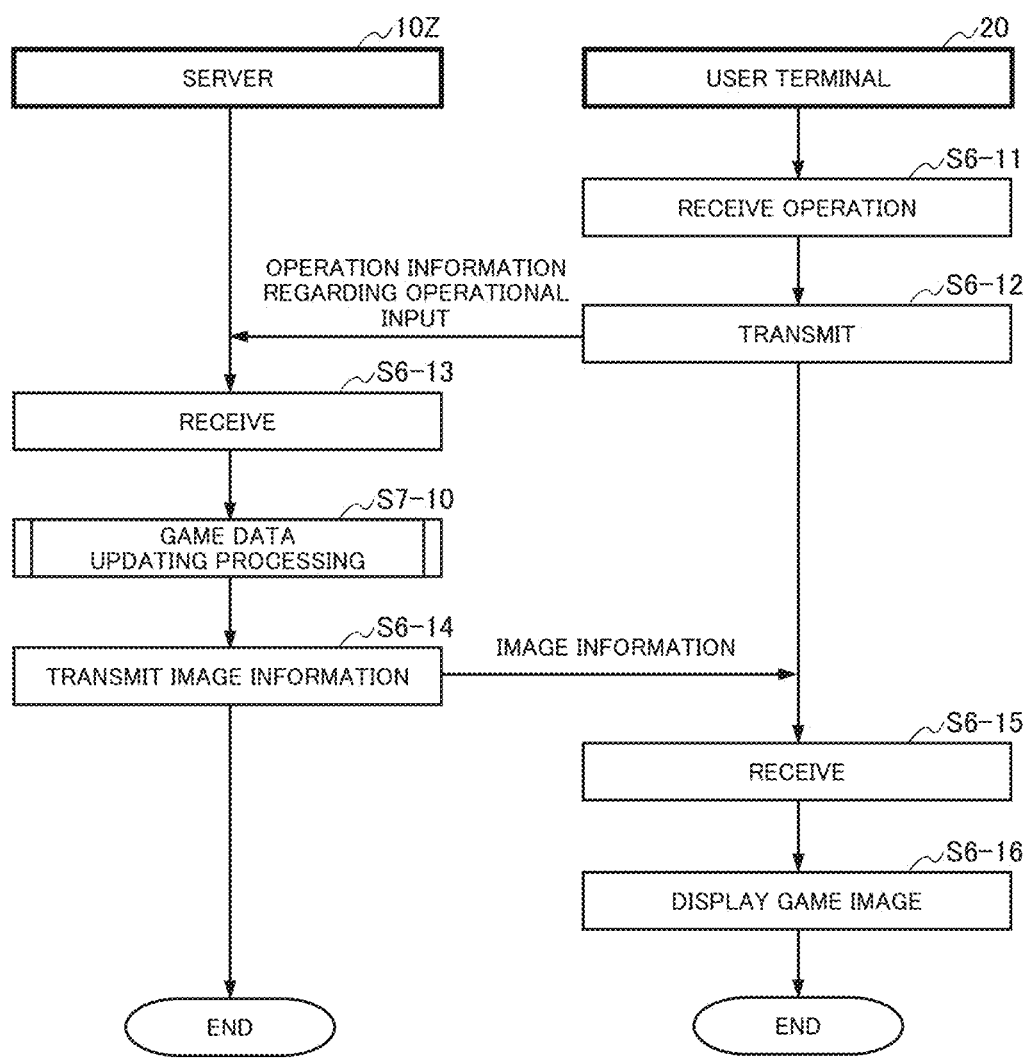
FIG. 18 is a flowchart showing an example of the game related processing corresponding to at least one of the embodiments according to the present invention.

FIG. 18 is a flowchart showing an example of the game related processing carried out by the system 100. Hereinafter, an operation of the server 10Z and the terminal 20 will be described as an example. In this regard, description of components or portions that have already been explained will be omitted from a point of view to avoid repeated explanation. The game related processing described above is periodically carried out at predetermined time intervals, for example.

In the game related processing, the terminal 20 first receives an operational input from the user (Step S6-11), and transmits information regarding the received operational input to the server 10Z (Step S6-12).

The server 10Z receives operation information (i.e., the information regarding the received operational input) from the terminal 20 (Step S6-13), and carries out game data updating processing (Step S7-10). In the game data updating processing, processing to update game data by means of various kinds of processes is carried out. Image information for causing a display device of the terminal 20 to display a game image is generated on the basis of the updated game data. In this regard, the case where the operation information is received from the terminal 20 has been explained in the present embodiment. However, the server 10Z may be configured so as to receive operation information from each of the terminals 201 to 20N other than the terminal 20 in the similar manner.

The server 10Z transmits the image information generated in the game data updating processing to the terminal 20 (Step S6-14), and terminates the processing herein. In this regard, in the present embodiment, explanation is made so that the image information is transmitted to the terminal 20. However, the server 10Z may be configured so that the image information is similarly transmitted to each of the terminals 201 to 20N other than the terminal 20.

The terminal 20 receives the image information from the server 10Z (Step S6-15), displays the game image (Step S6-16), and terminates the processing herein.

Figure 19:
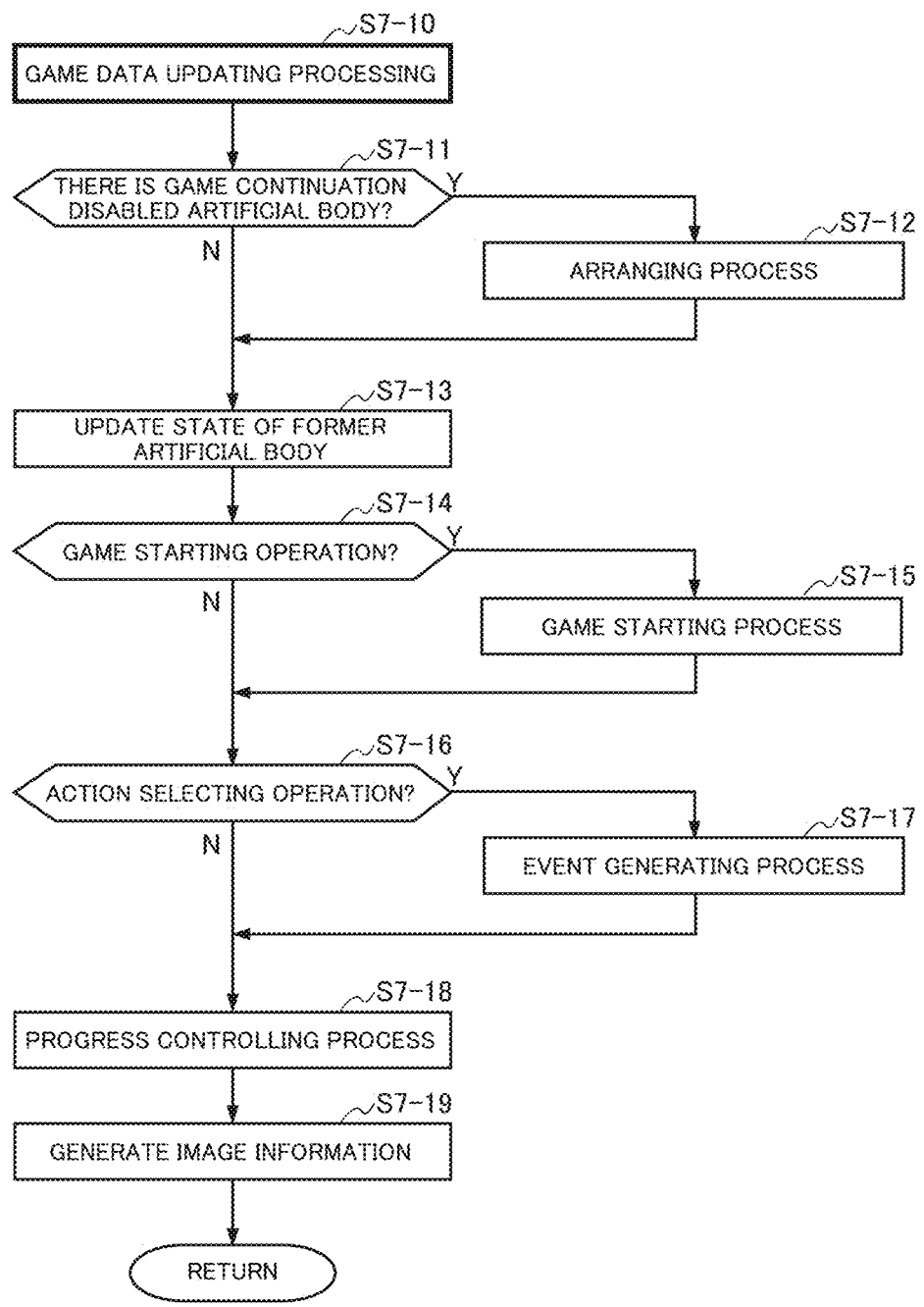
FIG. 19 is a flowchart showing an example of game data updating processing corresponding to at least one of the embodiments according to the present invention.

FIG. 19 is a flowchart showing an example of the game data updating processing carried out by the server 10Z of the system 100. Hereinafter, an operation of the server 10Z will be described as an example. In this regard, description of components or portions that have already been explained will be omitted from a point of view to avoid repeated explanation.

In the game data updating processing, the server 10Z first determines whether there is an artificial body that becomes a game continuation disabled state or not (Step S7-11). In a case where it is determined that there is an artificial body that becomes a game continuation disabled state ("Yes" at Step S7-11), the server 10Z carries out an arranging process (Step S7-12). In the arranging process, the server 10Z first specifies a spot of a game space at which the artificial body became the game continuation disabled state. The server 10Z then determines positional information, which indicates an arranged position of a former artificial body, on the basis of the specified spot. Subsequently, the server 10Z generates the predetermined information associated with the former artificial body on the basis of the player character information that has been associated with the artificial body until the artificial body becomes the game continuation disabled state. The server 10Z then generates former artificial body information in which the determined positional information, the predetermined information, and the state information to which initial values of a stage and update timing are set are associated with each other. In this regard, the player character information is obtained by referring to the user related information of the artificial body (that is, the user who operates it) that became the game continuation disabled state. The server 10Z then stores the generated former artificial body information in the storing section 17Z.

On the other hand, in a case where it is determined that there is no artificial body that becomes a game continuation disabled state ("No" at Step S7-11), the server 10Z carries out a process to update a state of the former artificial body (Step S7-13). For example, the server 10Z refers to the former artificial body information (in particular, the state information that indicates the state of the former artificial body) to determine presence or absence of a former artificial body whose state is to be updated. In a case where there is a former artificial body whose state is to be updated, the server 10Z updates the state information thereof.

Subsequently, the server 10Z determines whether an operation indicated by the operation information is a game starting operation or not (Step S7-14). In a case where it is determined that the operation is the game starting operation ("Yes" at Step S7-14), the server 10Z carries out a game starting process (Step S7-15). For example, the server 10Z generates user related information in which the user related information of the user who transmits the operation information is associated with the player character information to which an initial value is set. The player character information to which the predetermined initial value is set is information in which an artificial body ID for which the video game is started, an initial value of the action history as the action history information, and an initial value of the parameter as the parameter information are associated with each other, for example. Subsequently, the server 10Z stores the generated user related information in the storing section 17Z, and causes the processing flow to shift to Step S7-16. In this regard, the server 10Z may be configured so that the initial value of the parameter is determined by referring to the setting information and/or the parameter information of the artificial body that became the game continuation disabled state. Namely, the server 10Z may be configured so that the initial value of the parameter is determined as a value obtained by taking over the items with which the artificial body that became the game continuation disabled state is equipped and a part or all of the parameters.

On the other hand, in a case where it is determined that the operation is not the game starting operation ("No" at Step S7-14), the server 10Z determines whether the operation indicated by the received operation information is an action selecting operation for generating an event or not (Step S7-16). More specifically, the server 10Z determines whether the operation is an operation to select an action in the state where the artificial body operated by the user (that is, via the user terminal 20) moves to an arranged position of any former artificial body or the vicinity thereof. In a case where it is determined that the operation is the action selecting operation ("Yes" at Step S7-16), the server 10Z carries out an event generating process (Step S7-17). For example, the server 10Z specifies the selected action. Subsequently, the server 10Z refers to the former artificial body information and information regarding the user who carried out the operational input, and specifies a variable element for determining the event (in the present embodiment, the state information, the predetermined information, the user ID associated with the former artificial body, and the user ID of the user who carried out the selection operation). Subsequently, the server 10Z determines the event to be generated on the basis of the specified action, the specified variable element, and the event information, and updates the game data so as to generate the determined event. When the event generating process is carried out, the server 10Z causes the processing shift to a process at Step S7-18.

In this regard, the server 10Z may be configured so as to subsequently carry out, when the event generating process is carried out, a process of removing the former artificial body that becomes an action target from the game space. For example, the server 10Z deletes the former artificial body information corresponding to the former artificial body that became the action target. Namely, in this case, after a user A selects "collection" for a former artificial body A, the user A cannot select any action against the former artificial body A (this is because the former artificial body disappears). In other words, selection of an action for the former artificial body may be carried out only once. In this case, the server 10Z may further be configured so that the other user B can select an action against the former artificial body A. For example, the server 10Z may be configured so as to: associate a user ID of the user with the former artificial body information as a user who carried out the selection of the action; determine whether the user ID of the user whose artificial body moves to the arranged position of the former artificial body or the vicinity thereof has already been associated with the former artificial body information as the user who carried out the selection of the action or not; and receive selection of an action in a case where the determination is made in the affirmative. By providing the restriction for selection of an action in this manner, whether either the collection or the repair is to be selected is a matter that the user should consider on causing the video game to proceed. Therefore, it is possible to increase the range of progress of the video game, and to improve interest in or the taste of the video game.

Figure 20B:
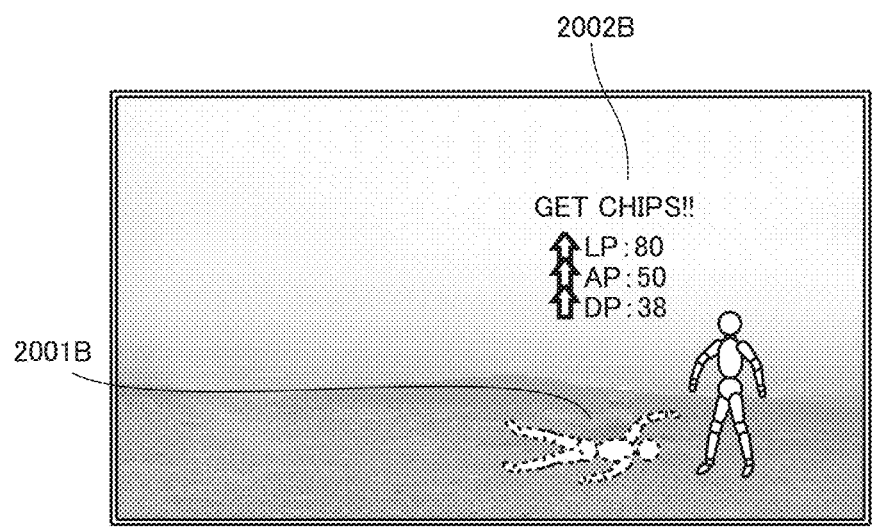
Figure 20C:
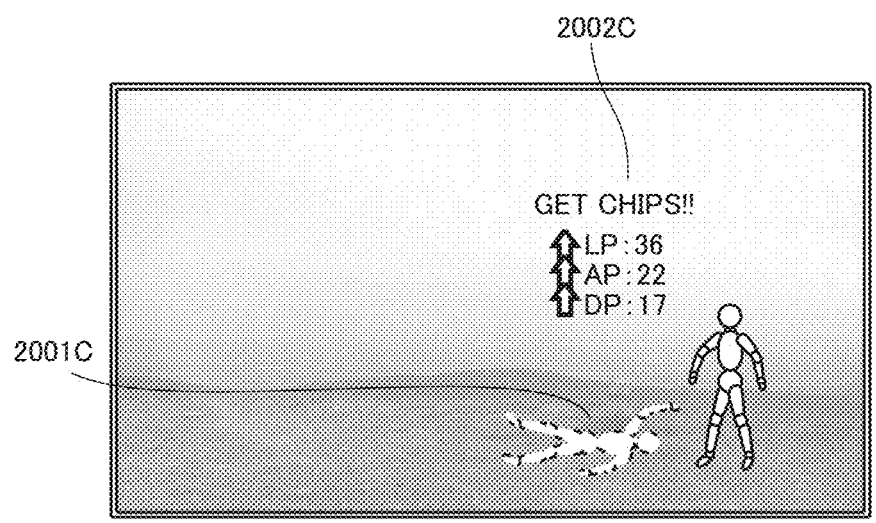

Here, an event to be generated will specifically be described with reference to the event information of FIG. 17, FIG. 20A and FIG. 21. FIG. 20 is an explanatory drawing for showing an example of the case where "collection" is selected as the selected action in a case where a user who operates a former artificial body is the same as a user of an artificial body. As shown in FIG. 20, when "collection" is selected as the selected action, an event in which a privilege is given is generated. In particular, FIG. 20A shows an example of the event in a case where the state of the former artificial body 2001A is in the normal state; FIG. 20B shows an example of the event in a case where the state of a former artificial body 2001B is in the rotten state; and FIG. 20C shows an example of the event in a case where the state of a former artificial body 2001C is in the polluted state. As shown in FIG. 20A, FIG. 20B, and FIG. 20C, a privilege 2002A, 2002B, or 2002C that the user can obtain is deteriorated (value of the obtained privilege is decreased) as the state of the former artificial body is deteriorated in order of 2001A, 2001B, and 2001C.

Figure 21A:
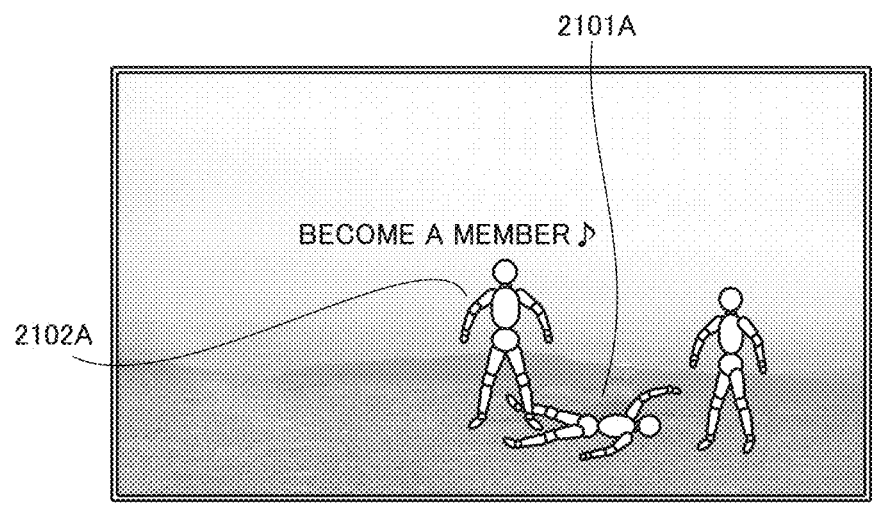
FIGS. 21A-21B are explanatory drawings for explaining the concept corresponding to at least one of the embodiments according to the present invention.
Figure 21B:
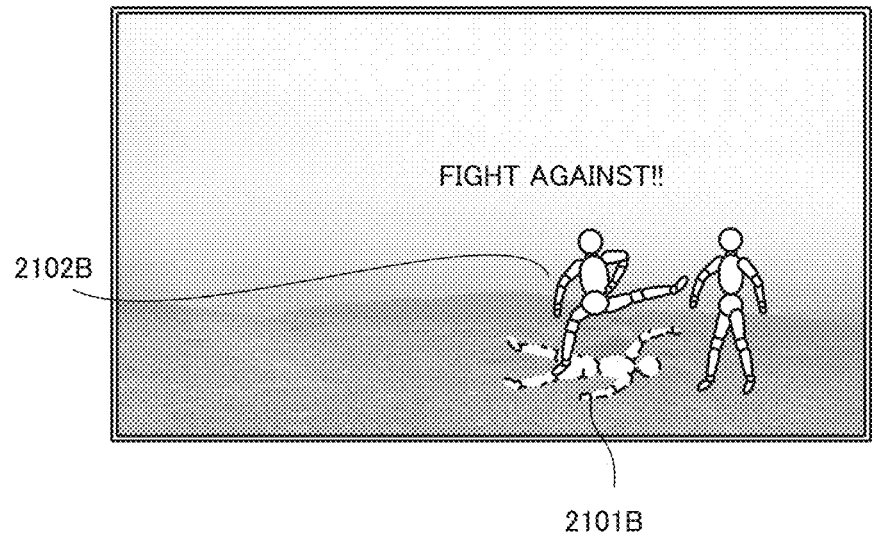

On the other hand, FIG. 21 is an explanatory drawing showing an example of the case where "repair" is selected as the selected action. As shown in FIG. 21, when the "repair" is selected as the selected action, an event that the former artificial body becomes an ally character or an enemy character is generated. In particular, FIG. 21A shows an example of the event of the case where a state of a former artificial body 2101A is in a normal or rotten state, and FIG. 21B shows an example of the event of the case where a state of a former artificial body 2101B is in a rotten state. As shown in FIG. 21A and FIG. 21B, in a case where the state of the former artificial body is in the normal or rotten state, the former artificial body 2101A becomes an ally character 2102A. On the other hand, in a case where the state of the former artificial body is in the rotten state, the former artificial body 2101B becomes an enemy character 2102B. Namely, as shown in FIG. 21A, in a case where the state of the former artificial body is in the normal or rotten state, an event that surely generates an advantageous effect for the user is generated. On the other hand, as shown in FIG. 21B, in a case where the state of the former artificial body is in the rotten state, an event that does not always generate an advantageous effect for the user is generated.

On the other hand, in a case where it is determined that the operation is not the action selecting operation ("No" at Step S7-16), the server 10Z carries out progress controlling process for updating other game data on the basis of the received operation information (Step S7-18). As an example of the progress controlling process, there is a process of updating information regarding movement of the artificial body (for example, positional information of the artificial body) and various kinds of parameters in the video game. The information regarding the movement of the artificial body (for example, the positional information of the artificial body) and the various kinds of parameters in the video game are managed by updating the game data stored in a predetermined storage region by the server 10Z.

When the progress controlling process is carried out, the server 10Z generates, on the basis of the generated and updated game data, image information for causing the terminal 20 to display the game image on a display screen (Step S7-19), and causes the processing flow to return to the game related processing.

As explained above, as one side of the sixth embodiment, the server 10Z for controlling progress of the video game is configured so as to include the starting section 11Z, the arranging section 12Z, the receiving section 13Z, and the generating section 14Z. Thus, the starting section 11Z starts, in a case where a player character becomes a game continuation disabled state in the game space, progress of the video game by using, as the player character, a character the same as or different from the player character that became the game continuation disabled state; the arranging section 12Z arranges, as the object corresponding to the player character that became the game continuation disabled state, the corresponding object, with which the predetermined information regarding the player character that became the game continuation disabled state is associated, at the spot of the game space where the player character became the game continuation disabled state or in the vicinity of the spot; the receiving section 13Z receives selection of one action from the two or more kinds of predetermined actions corresponding to the corresponding object on the basis of a situation that the player character moves to the arranged position of the corresponding object or the vicinity thereof; and the generating section 14Z generates the related event related to the corresponding object in the video game on the basis of the selected one action and the predetermined information. Therefore, it is possible to increase the range of progress of the video game by using a situation that the player character became the game continuation disabled state, and to improve interest in or the taste of the video game.

In this regard, as mentioned in the sixth embodiment described above, the system 100 may be configured so as to cause the user who operated the artificial body that became the game continuation disabled state to restart (that is, restart after taking over) the video game by using a new artificial body obtained by taking over information from the artificial body that became the game continuation disabled state. For example, the system 100 stores, in a storing section, save information containing setting information and parameter information associated with the artificial body at predetermined timing in progress of the video game and at the time; determines the setting information and the parameter information associated with the new artificial body on the basis of the save information; and restarts the video game after taking over the information. Further, the system 100 may be configured so as to contain the information that is surely taken over to the new artificial body and information that may be taken over to the new artificial body in a case where the restart after taking over is carried out. For example, the information that is surely taken over to the new artificial body is set as the save information described above, and the information that may be taken over to the new artificial body is set as the predetermined information of the former artificial body. Specifically, the system 100 is configured so as to: take over all of the setting information and the parameter information, which are stored as the save information to the new artificial body; and store the predetermined information of the former artificial body so that the setting information and the parameter information during a period of time from timing when the save information is stored to the time when the artificial body becomes the game continuation disabled state (that is, a period of time during which any information has not been saved), thereby, in a case where an action called "collection" is carried out, referring to the predetermined information and taking over the setting information and the parameter information during the period of time to the new artificial body. In other words, the system 100 is configured so that the predetermined information associated with the former artificial body is generated on the basis of information that has been obtained for a time from timing when the save information is stored to timing the artificial body becomes the game continuation disabled state. Namely, in the example described above, in a case where the artificial body becomes the game continuation disabled state, the system 100 restarts progress of the video game from a state at the time of saving. Thus, an experience value and the like that have been obtained for the time from the time of saving to the time when the artificial body becomes the game continuation disabled state (the period of time during which any information has not been saved) are not taken over, and they thus go to waste. However, the user can collect the experience value and the like that have been obtained for the period of time during which any information has not been saved by operating the new artificial body and selecting the action called "collection" against the former artificial body. Therefore, it becomes a merit for the user to select the action called "collection" in a case where many experience values have been obtained for the time from the time of saving to the time when the artificial body becomes the game continuation disabled state, for example. In this regard, the system 100 may be configured so that the save information in this case is generated and stored on the basis of an operation of the user (for example, a saving operation). Alternatively, the system 100 may be configured so that the save information is automatically generated and stored on the basis of arrival to a predetermined spot. Further, the system 100 may be configured so that the save information is contained in the user related information.

In this regard, it has not mentioned particularly in the sixth embodiment described above. However, the system 100 may be configured so as to: generate any one event of the event that surely generates an advantageous effect for the user and the event that does not always generate an advantageous effect for the user in accordance with the state of the former artificial body; and further generate a more highly valued event than the event that surely generates an advantageous effect for the user in a case where the generated event is the event that does not always generate an advantageous effect for the user (that is, as shown in FIG. 21B, the event that the former artificial body becomes an enemy character like the case where action called "repair" is selected when the state of the former artificial body is in the rotten state) and a predetermined condition (for example, a condition that the former artificial body that became the enemy character is defeated) is then satisfied in the generated event. For example, in a case where the enemy character arising from the former artificial body is defeated, an item with a high degree of rarity is given. Further, value of the event to be generated may be set in accordance with strength (or intelligence) of the defeated enemy character arising from the former artificial body. For example, the system 100 may be configured so that the stronger the enemy character is, the higher the degree of rarity of an item that is to be given by means of defeat is set. Namely, the system 100 is configured so as to provide, to the user, selection of whether to take a risk in order to obtain more highly valued effect or not, thereby providing a video game with higher strategy than conventional ones by using a situation that the artificial body (that is, the player character) becomes the game continuation disabled state. Therefore, it is possible to improve interest in or the taste of the video game. In this regard, the system 100 may manage information on the event by the defeat described above so that such information is contained in the event information.

Further, it has not mentioned particularly in the sixth embodiment described above. However, the system 100 may be configured so as to generate, in the action of "repair", an event that the former artificial body becomes an ally character or an enemy character in accordance with the state of the former artificial body; or so that the state of the former artificial body is not used as a condition to generate such an event. For example, the system 100 may be configured so as to generate only an event that the former artificial body becomes an ally character in the action of "repair". Alternatively, the system 100 may be configured so as to generate the event that the former artificial body becomes an ally character or an enemy character on the basis of whether the user who operated the former artificial body is the same as the user of the artificial body or not. Otherwise, the system 100 may be configured so as to generate the event that the former artificial body becomes an ally character or an enemy character on the basis of whether the user who operated the former artificial body and the user of the artificial body have a friend relationship or not.

In this regard, it has not mentioned particularly in the sixth embodiment described above. However, the system 100 is configured so as to include a condition that a distance between the artificial body and the former artificial body becomes a fixed distance (that is, set a condition regarding closeness with respect to a distance) as a condition for allowing the user to select an action against the former artificial body. However, the system 100 is not limited to such a configuration. For example, a condition regarding proximity of a time may be set. Namely, the system 100 may be configured so that the user is allowed to select an action against the former artificial body on the basis of a situation that a condition based on a time when to become a game continuation disabled state (for example, plus or minus one hour) is satisfied. According to such a configuration of the system 100, it is possible to improve interest in or the taste of the video game by using a situation to become a game continuation disabled state, and this makes it possible to encourage the user to carry out continuous participation in the video game.

In this regard, it has not mentioned particularly in the sixth embodiment described above. However, the system 100 may be configured so that, in a case where the artificial body moves to the vicinity of the former artificial body, access to the former artificial body is received before selection of an action or at the time when to select an action and information regarding the former artificial body is displayed. Namely, the system 100 may be configured so that when the access to the former artificial body is received, information regarding choices of the selectable action is displayed together with the former artificial body information regarding the former artificial body on the basis of various kinds of information associated with the former artificial body (or by referring to a storage region for storing the information for display at the time when to access to the former artificial body). According to such a configuration of the system 100, it is possible to determine which action is to be selected by referring to the display of the former artificial body information. This makes it possible to increase the range of progress of the video game, and to improve interest in or the taste of the video game.

In this regard, it has not mentioned particularly in the sixth embodiment described above. However, the system 100 may be configured so as to have a function to notify a user corresponding to a former artificial body that selection of an action to the former artificial body is carried out by other user different from the user. Here, the user corresponding to the former artificial body means a user who operated an artificial body that became the game continuation disabled state. Therefore, the other user different from the user corresponding to the former artificial body means other user different from the user who operated the artificial body that became the game continuation disabled state. Further, the content to be notified is not limited particularly. However, it is preferable that the content includes, for the notified user, information indicating the user who carried out selection of an action, a type of the selected action, a result of the selection of the action, and the like in addition to a fact that the selection of the action is carried out.

As explained above, one or two or more shortages can be solved by each of the embodiments according to the present application. In this regard, the effects by each of the embodiments are non-limiting effects or one example of the non-limiting effects.

In this regard, in each of the embodiments described above, each of the plurality of user terminals 20 and 201 to 20N and the server 10 carries out the various kinds of processing described above in accordance with various kinds of control programs (for example, a video game processing program) stored in the storage device with which the corresponding terminal or server is provided.

Further, the configuration of the system 100 is not limited to the configuration that has been explained as an example of each of the embodiments described above. For example, the system 100 may be configured so that the server 10 carries out a part or all of the processes that have been explained as the processes carried out by the user terminal. Alternatively, the system 100 may be configured so that any of the plurality of user terminals 20, 201 to 20N (for example, the user terminal 20) carries out a part or all of the processes that have been explained as the processes carried out by the server 10. Further, the system 100 may be configured so that a part or all of the storing sections included in the server 10 is included in any of the plurality of user terminals 20, 201 to 20N. Namely, the system 100 may be configured so that a part or all of the functions of any one of the user terminal 20 and the server 10 according to the system 100 is included in the other.

In this regard, it has not mentioned particularly in the sixth embodiment described above. However, each of the user terminals 20, 201 to 20N may be configured so as to manage various kinds of information containing the former artificial body information to control progress of the video game. Moreover, each of the user terminals 20, 201 to 20N may be configured so as to: be connected to the server 10; transmit former artificial body information stored in his or her own user terminal to the server; cause the server to manage the former artificial body information; and receive former artificial body information, which was generated in the other user terminal and is managed by the server, from the server. Further, each of the user terminals 20, 201 to 20N may be configured so as to arrange a former artificial body generated by other user of the other user terminal in the game space of the video game that proceeds in his or her own user terminal on the basis of the received former artificial body information thus generated in the other user terminal.

APPENDIX

The explanation of the embodiments described above has been described so that the following inventions can be at least realized by a person having a normal skill in the art to which the present invention belongs.

(1)

A non-transitory computer-readable medium including a program product for causing a server to realize functions to control progress of a video game in a game space, wherein the functions include:

a starting function configured to start, in a case where a player character becomes a game continuation disabled state in the game space, progress of the video game by using, as the player character, a character the same as or different from the player character that became the game continuation disabled state;

an arranging function configured to arrange, as an object corresponding to the player character that became the game continuation disabled state, a corresponding object at a spot of the game space where the player character became the game continuation disabled state or in the vicinity of the spot, predetermined information regarding the player character that became the game continuation disabled state being associated with the corresponding character;

a receiving function configured to receive selection of one action from two or more kinds of predetermined actions corresponding to the corresponding object in a case where the player character moves to an arranged position of the corresponding object or the vicinity thereof; and a generating function configured to generate a related event in the video game on the basis of the selected one action and the predetermined information, the related event being related to the corresponding object.

(2)

The non-transitory computer-readable medium according to (1), wherein the functions further include:

a state changing function configured to change a state of the corresponding object in accordance with elapse of a time, and wherein the generating function includes a function configured to generate the related event in the video game on the basis of the selected one action, the predetermined information, and the state of the corresponding object.

(3)

The non-transitory computer-readable medium according to (1) or (2), wherein the generating function includes a function configured to generate the related event in which a predetermined privilege based on the predetermined information is given to a user who selects a first action or the player character operated by the user in a case where the selected one action is the first action.

(4)

The non-transitory computer-readable medium according to any one of (1) to (3), wherein the generating function includes:

a function configured to generate the related event, in which an ally character corresponding to the corresponding object appears in the game space, in a case where the selected one action is a second action and a state of the corresponding object is a first state; and a function configured to generate the related event, in which an enemy character corresponding to the corresponding object appears in the game space, in a case where the selected one action is the second action but the state of the corresponding object is a second state.

(5)

The non-transitory computer-readable medium according to any one of (1) to (4), wherein the predetermined information contains identification information by which a user who operates the player character that became the game continuation disabled state is specified, and wherein the generating function includes a function configured to generate the related event whose content for the same action is different between the case where a user who selects the one action is the same as the user who operates the player character that became the game continuation disabled state and the case where the users are not the same as each other.

(6)

The non-transitory computer-readable medium according to (4), wherein the generating function includes a function configured to determine strength of the enemy character on the basis of a state of the corresponding object.

(7)

The non-transitory computer-readable medium according to any one of (4) to (6), wherein the generating function includes a function configured to determine strength of the enemy character on the basis of the predetermined information.

(8)

The non-transitory computer-readable medium according to any one of (1) to (7), wherein the arranging function includes a function configured to display the corresponding object in a display mode corresponding to a state of the corresponding object.

(9)

The non-transitory computer-readable medium according to any one of (1) to (8), wherein the arranging function includes a function configured to cause the corresponding object to disappear from the game space on the basis of elapse of a predetermined time.

(10)

The non-transitory computer-readable medium according to (9), wherein the functions further include:

a setting function configured to allow the player character to set a first in-game element, and wherein the arranging function includes a function configured to extend or shorten a time required until the corresponding object disappears in a case where the first in-game element is set to the player character that became the game continuation disabled state.

(11)

The non-transitory computer-readable medium according to any one of (1) to (10), wherein the predetermined information contains identification information by which a user who operates the player character that became the game continuation disabled state is specified, and wherein the functions further include:

a notifying function configured to notify, in a case where the receiving function receives selection of one action from a user different from the user who operated the player character that became the game continuation disabled state, the user who operates the player character that became the game continuation disabled state of information regarding the selected one action or the generated event.

(12)

The non-transitory computer-readable medium according to any one of (1) to (11), wherein the functions further include:

a storing function configured to store the predetermined information in a predetermined storage region.

(13)

A non-transitory computer-readable medium including a program product for causing a user terminal to realize at least one function of the functions that the program product described in any one of (1) to (12) causes the server to realize, the user terminal being capable of communicating with the server.

(14)

A server into which the program product contained in the non-transitory computer-readable medium according to any one of (1) to (12) is installed.

(15)

A system for controlling progress of a video game in a game space, the system comprising a communication network, a server, and a user terminal, the system comprising:

a starting section configured to start, in a case where a player character becomes a game continuation disabled state in the game space, progress of the video game by using, as the player character, a character the same as or different from the player character that became the game continuation disabled state;

an arranging section configured to arrange, as an object corresponding to the player character that became the game continuation disabled state, a corresponding object at a spot of the game space where the player character became the game continuation disabled state or in the vicinity of the spot, predetermined information regarding the player character that became the game continuation disabled state being associated with the corresponding character;

a receiving section configured to receive selection of one action from two or more kinds of predetermined actions corresponding to the corresponding object in a case where the player character moves to an arranged position of the corresponding object or the vicinity thereof; and a generating section configured to generate a related event in the video game on the basis of the selected one action and the predetermined information, the related event being related to the corresponding object.

(16)

The system according to (15),
wherein the server includes the starting section, the arranging section, the receiving section, and the generating section, and
wherein the user terminal includes:
an outputting section configured to output a game image to a display screen of a display device on the basis of image information for causing the display device to display the game image, the game image indicating progress of the video game, the game image being transmitted from the server.

(17)

A non-transitory computer-readable medium including a program product for causing a user terminal to realize functions to control progress of a video game in a game space,
wherein a server includes:
a starting function configured to start, in a case where a player character becomes a game continuation disabled state in the game space, progress of the video game by using, as the player character, a character the same as or different from the player character that became the game continuation disabled state;
an arranging function configured to arrange, as an object corresponding to the player character that became the game continuation disabled state, a corresponding object at a spot of the game space where the player character became the game continuation disabled state or in the vicinity of the spot, predetermined information regarding the player character that became the game continuation disabled state being associated with the corresponding character;
a receiving function configured to receive selection of one action from two or more kinds of predetermined actions corresponding to the corresponding object in a case where the player character moves to an arranged position of the corresponding object or the vicinity thereof; and
a generating function configured to generate a related event in the video game on the basis of the selected one action and the predetermined information, the related event being related to the corresponding object, and
wherein the functions include:
an outputting function configured to output a game image to a display screen of a display device on the basis of information for displaying the game image, the information being transmitted from the server, the game image showing progress of the video game.

(18)

A non-transitory computer-readable medium including a program product for causing a user terminal to realize functions to control progress of a video game in a game space,
wherein the functions include:
a starting function configured to start, in a case where a player character becomes a game continuation disabled state in the game space, progress of the video game by using, as the player character, a character the same as or different from the player character that became the game continuation disabled state;
an arranging function configured to arrange, as an object corresponding to the player character that became the game continuation disabled state, a corresponding object at a spot of the game space where the player character became the game continuation disabled state or in the vicinity of the spot, predetermined information regarding the player character that became the game continuation disabled state being associated with the corresponding character;
a receiving function configured to receive selection of one action from two or more kinds of predetermined actions corresponding to the corresponding object in a case where the player character moves to an arranged position of the corresponding object or the vicinity thereof; and
a generating function configured to generate a related event in the video game on the basis of the selected one action and the predetermined information, the related event being related to the corresponding object.

(19)

A method of controlling progress of a video game in a game space, the method comprising:
a starting process configured to start, in a case where a player character becomes a game continuation disabled state in the game space, progress of the video game by using, as the player character, a character the same as or different from the player character that became the game continuation disabled state;
an arranging process configured to arrange, as an object corresponding to the player character that became the game continuation disabled state, a corresponding object at a spot of the game space where the player character became the game continuation disabled state or in the vicinity of the spot, predetermined information regarding the player character that became the game continuation disabled state being associated with the corresponding character;
a receiving process configured to receive selection of one action from two or more kinds of predetermined actions corresponding to the corresponding object in a case where the player character moves to an arranged position of the corresponding object or the vicinity thereof; and
a generating process configured to generate a related event in the video game on the basis of the selected one action and the predetermined information, the related event being related to the corresponding object.

(20)

A method of controlling progress of a video game in a game space, the method being executed by a system, the system comprising a communication network, a server, and a user terminal, the method comprising:
a starting process configured to start, in a case where a player character becomes a game continuation disabled state in the game space, progress of the video game by using, as the player character, a character the same as or different from the player character that became the game continuation disabled state;
an arranging process configured to arrange, as an object corresponding to the player character that became the game continuation disabled state, a corresponding object at a spot of the game space where the player character became the game continuation disabled state or in the vicinity of the spot, predetermined information regarding the player character that became the game continuation disabled state being associated with the corresponding character;
a receiving process configured to receive selection of one action from two or more kinds of predetermined actions corresponding to the corresponding object in a case where the player character moves to an arranged position of the corresponding object or the vicinity thereof; and
a generating process configured to generate a related event in the video game on the basis of the selected one action and the predetermined information, the related event being related to the corresponding object.

According to one of the embodiments of the present invention, it is useful to increase the range of progress of a video game by using a situation that a player character becomes a game continuation disabled state, and to improve interest in or the taste of the video game.

What is claimed is:

1. A non-transitory computer-readable medium including a program product for causing a server to realize functions to control progress of a video game in a game space, the functions comprising:
a starting function configured to, in a case where a player character becomes a disabled state in the video game, continue progress of the video game by using, as the player character, a second character, the second character being same as or different from the player character that becomes the disabled state;
an arranging function configured to arrange, at an arranged position that corresponds to the player character that becomes the disabled state, an object, the arranged position being at a spot of the game space where the player character becomes the disabled state or in a vicinity of the spot, predetermined information regarding the player character that becomes the disabled state being associated with the object;
a receiving function configured to receive a selection of an action corresponding to the object in a case where the second character moves to the arranged position of the object or a vicinity of the arranged position, the action being selected from among two or more kinds of predetermined actions; and
a generating function configured to generate an event in the video game based on the selection of the action and the predetermined information associated with the object, the event being related to the object.

2. The non-transitory computer-readable medium according to claim 1,
wherein the functions further include:
a state changing function configured to change a state of the object in accordance with an elapse of time, and
wherein the generating function is configured to generate the event in the video game based on the selection of the action, the predetermined information, and the state of the object.

3. The non-transitory computer-readable medium according to claim 1,
wherein the generating function is configured to generate the event, with a predetermined privilege that is based on the predetermined information given to a user from which the selection of the action is received or the player character operated by the user in a case where the action is a first action of the two or more kinds of predetermined actions.

4. The non-transitory computer-readable medium according to claim 1,
wherein the generating function is configured to:
generate the event, with an ally character corresponding to the object appearing in the game space in a case where the action is a second action of the two or more kinds of predetermined actions and a state of the object is a first state; and
generate the event, with an enemy character corresponding to the object appearing in the game space in a case where the action is the second action and the state of the object is a second state.

5. The non-transitory computer-readable medium according to claim 1,
wherein the predetermined information contains identification information that specifies a first user that operates the player character that becomes the disabled state, and
wherein the generating function is configured to generate the event, with a content for the action being different between a first case in which the selection is received from the first user and a second case in which the selection is received from a second user different than the first user.

6. The non-transitory computer-readable medium according to claim 1,
wherein the arranging function is configured to display the object in a display mode corresponding to a state of the object.

7. The non-transitory computer-readable medium according to claim 1,
wherein the arranging function is configured to cause the object to disappear from the game space based on an elapse of a predetermined time period.

8. The non-transitory computer-readable medium according to claim 1,
wherein the predetermined information contains identification information that specifies a first user that operates the player character that becomes the disabled state, and
wherein the functions further include:
a notifying function configured to notify, in a case where the receiving function receives the selection of the action from a second user different than the first user, the first user regarding the selection of the action or the event.

9. The non-transitory computer-readable medium according to claim 1,
wherein the functions further include:
a storing function configured to store the predetermined information in a predetermined storage region.

10. A system for controlling progress of a video game in a game space, the system comprising:
a server; and
a user terminal connected to the server via a communication network,
wherein at least one of the server or the user terminal is configured to carry out processing in accordance with at least one control program, the processing including:
continuing, in a case where a player character becomes a disabled state in the video game, progress of the video game by using, as the player character, a second character, the second character being same as or different from the player character that becomes the disabled state;
arranging, at an arranged position that corresponds to the player character that becomes the disabled state, an object, the arranged position being at a spot of the game space where the player character becomes the disabled state or in a vicinity of the spot, predetermined information regarding the player character that becomes the disabled state being associated with the object;
receiving a selection of an action corresponding to the object in a case where the second character moves to the arranged position of the object or a vicinity of the arranged position, the action being selected from among two or more kinds of predetermined actions; and generating an event in the video game based on the selection of the action and the predetermined information associated with the object, the event being related to the object.

11. A non-transitory computer-readable medium including a program product for causing a user terminal to realize functions to control progress of a video game in a game space, the functions comprising:

a starting function configured to, in a case where a player character becomes a disabled state in the video game, continue progress of the video game by using, as the player character, a second character, the second character being same as or different from the player character that becomes the disabled state;

an arranging function configured to arrange, at an arranged position that corresponds to the player character that becomes the disabled state, an object, the arranged position being at a spot of the game space where the player character becomes the disabled state or in a vicinity of the spot, predetermined information regarding the player character that becomes the disabled state being associated with the object;

a receiving function configured to receive a selection of an action corresponding to the object in a case where the second character moves to the arranged position of the object or a vicinity of the arranged position, the action being selected from among two or more kinds of predetermined actions; and a generating function configured to generate an event in the video game based on the selection of the action and the predetermined information associated with the object, the event being related to the object.

* * * * *

UNITED STATES PATENT AND TRADEMARK OFFICE
CERTIFICATE OF CORRECTION

PATENT NO. : 10,576,377 B2
APPLICATION NO. : 15/900997
DATED : March 3, 2020
INVENTOR(S) : Taura Page 1 of 1

It is certified that error appears in the above-identified patent and that said Letters Patent is hereby corrected as shown below:

In the Claims

Column 33, Line 49 (Claim 3) please change "information given" to --information being given--

Signed and Sealed this
Eleventh Day of August, 2020

Andrei Iancu
*Director of the United States Patent and Trademark Office*